(12) United States Patent
Yang et al.

(10) Patent No.: US 7,583,348 B2
(45) Date of Patent: Sep. 1, 2009

(54) PIXEL STRUCTURE FOR LIQUID CRYSTAL DISPLAY

(75) Inventors: Kei-Hsiung Yang, Taoyuan (TW); Po-Sheng Shih, Hsinchu (TW)

(73) Assignee: Hannstar Display Corporation, Taipei (TW)

( * ) Notice: Subject to any disclaimer, the term of this patent is extended or adjusted under 35 U.S.C. 154(b) by 0 days.

(21) Appl. No.: 12/247,185

(22) Filed: Oct. 7, 2008

(65) Prior Publication Data

US 2009/0033816 A1    Feb. 5, 2009

Related U.S. Application Data

(62) Division of application No. 10/672,906, filed on Sep. 25, 2003, now Pat. No. 7,433,007.

(30) Foreign Application Priority Data

Mar. 3, 2003    (TW) .............................. 92104450 A

(51) Int. Cl.
*G02F 1/1343* (2006.01)

(52) U.S. Cl. ......................................... 349/144; 349/34
(58) Field of Classification Search ..................... None
See application file for complete search history.

(56) References Cited

U.S. PATENT DOCUMENTS

| 6,429,918 | B1 | 8/2002 | Choi et al. |
| 6,646,707 | B2 | 11/2003 | Noh et al. |
| 6,671,009 | B1 | 12/2003 | Hattori et al. |
| 6,771,343 | B2 | 8/2004 | Kim et al. |
| 6,831,295 | B2 | 12/2004 | Tsubo |

*Primary Examiner*—Richard H Kim
(74) *Attorney, Agent, or Firm*—Thomas, Kayden, Horstemeyer & Risley

(57) ABSTRACT

The present invention builds a metal electrode that is controlled by the common electrode in each pixel cell. During operation, a voltage is first applied to this metal electrode to transform the liquid crystal molecule over this metal electrode from the splay state to the bend state. Next, a voltage is applied to the pixel electrode to transform the liquid crystal molecule in the whole pixel region from the splay state to the bend state.

13 Claims, 17 Drawing Sheets

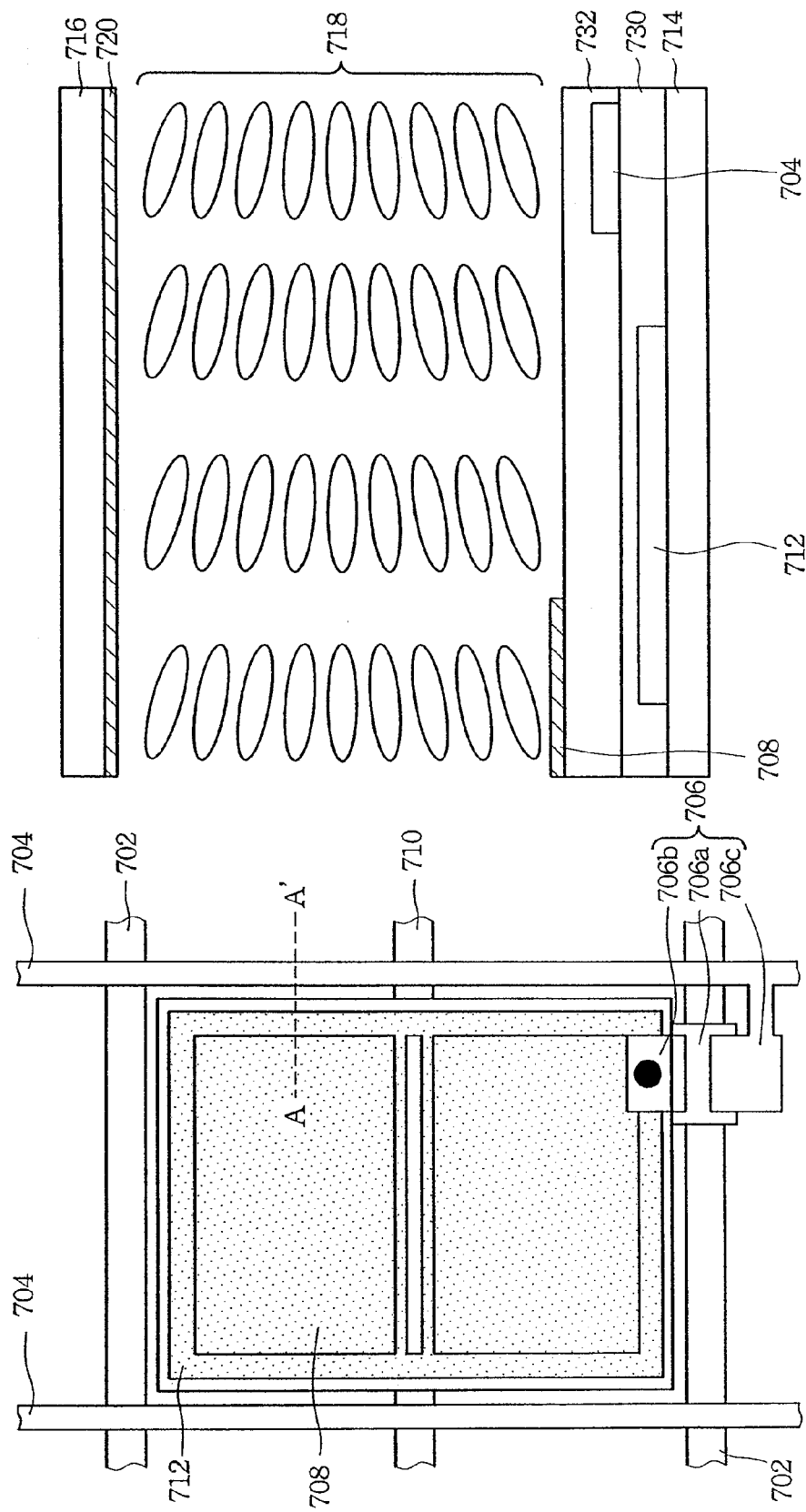

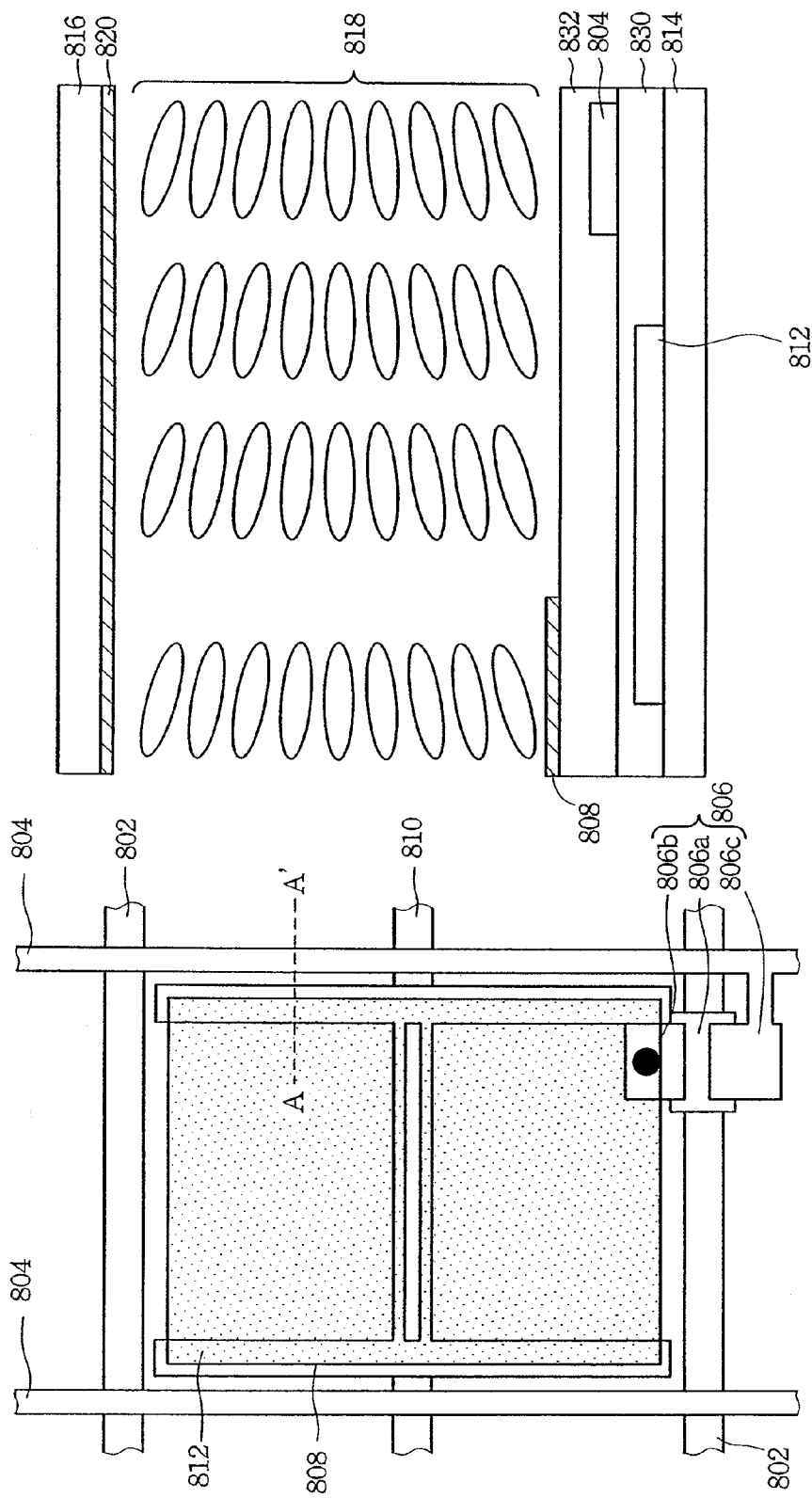

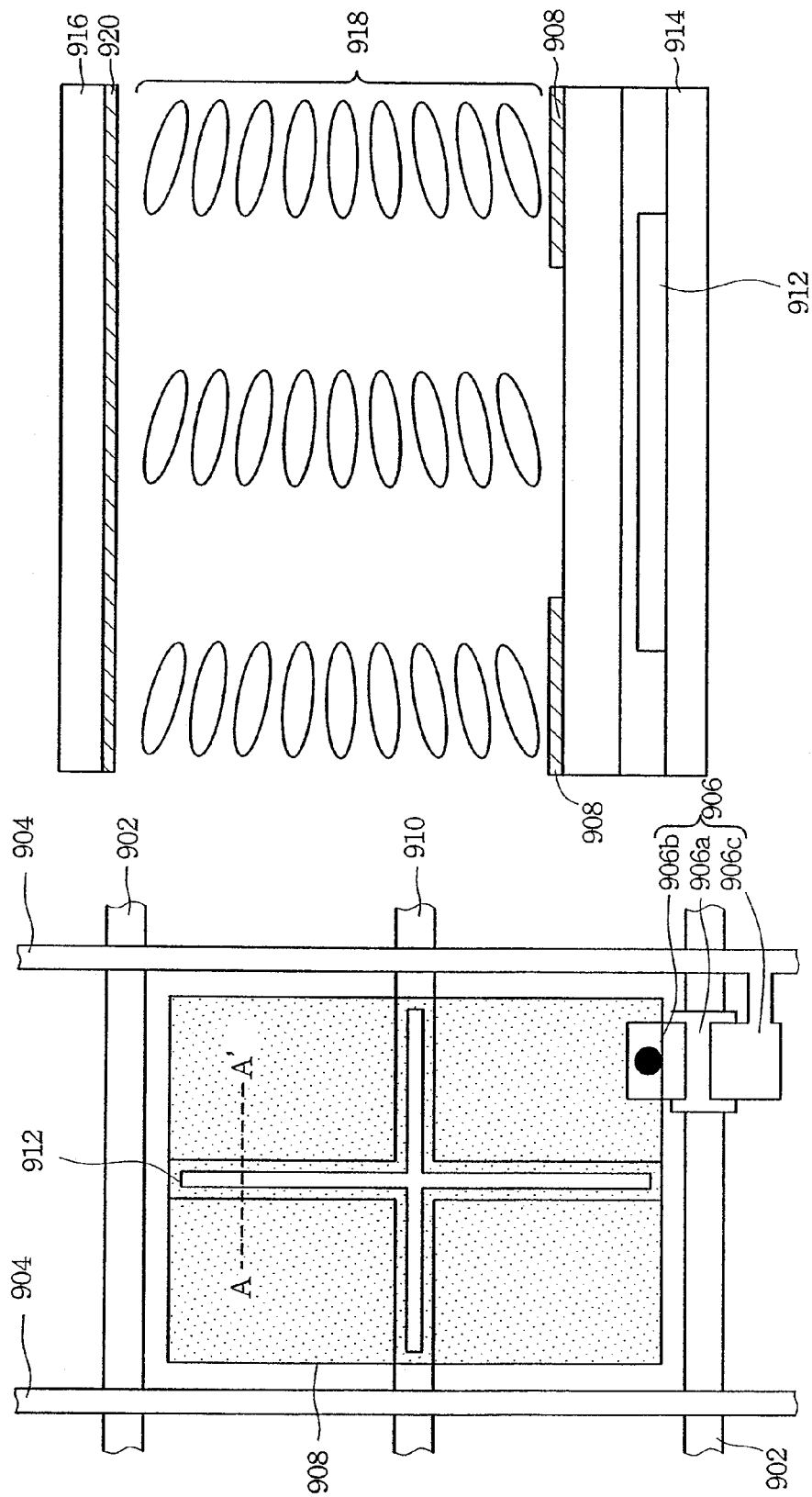

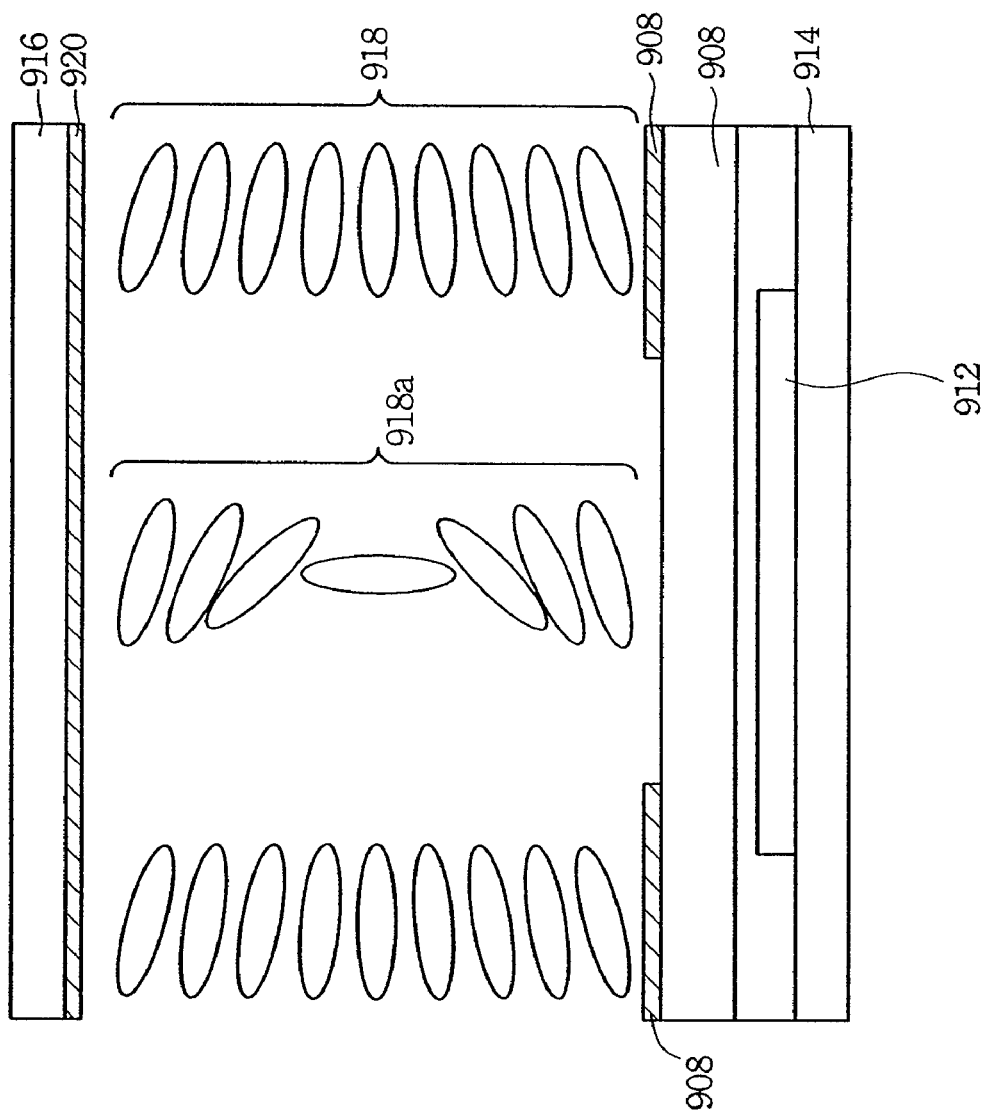

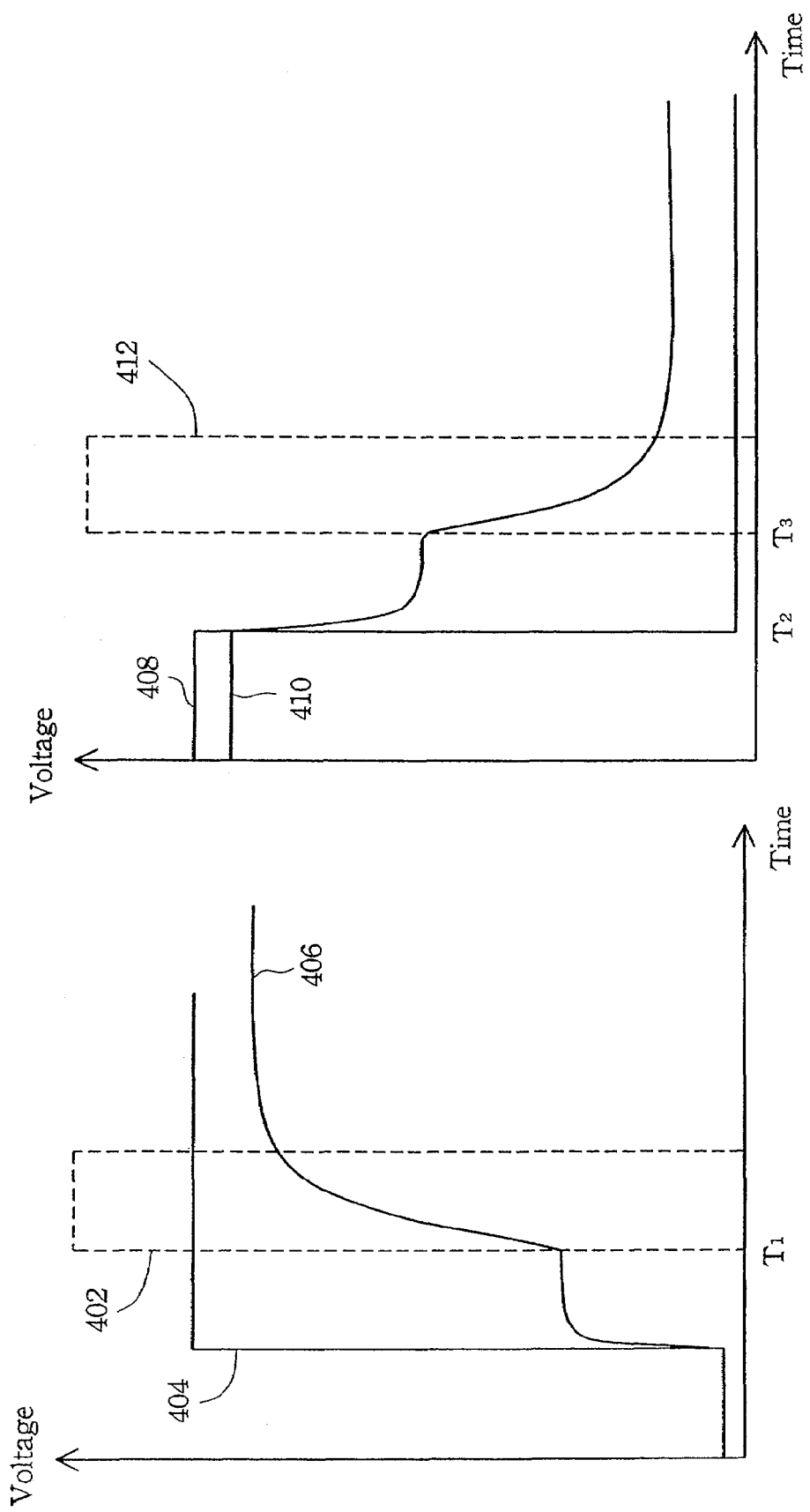

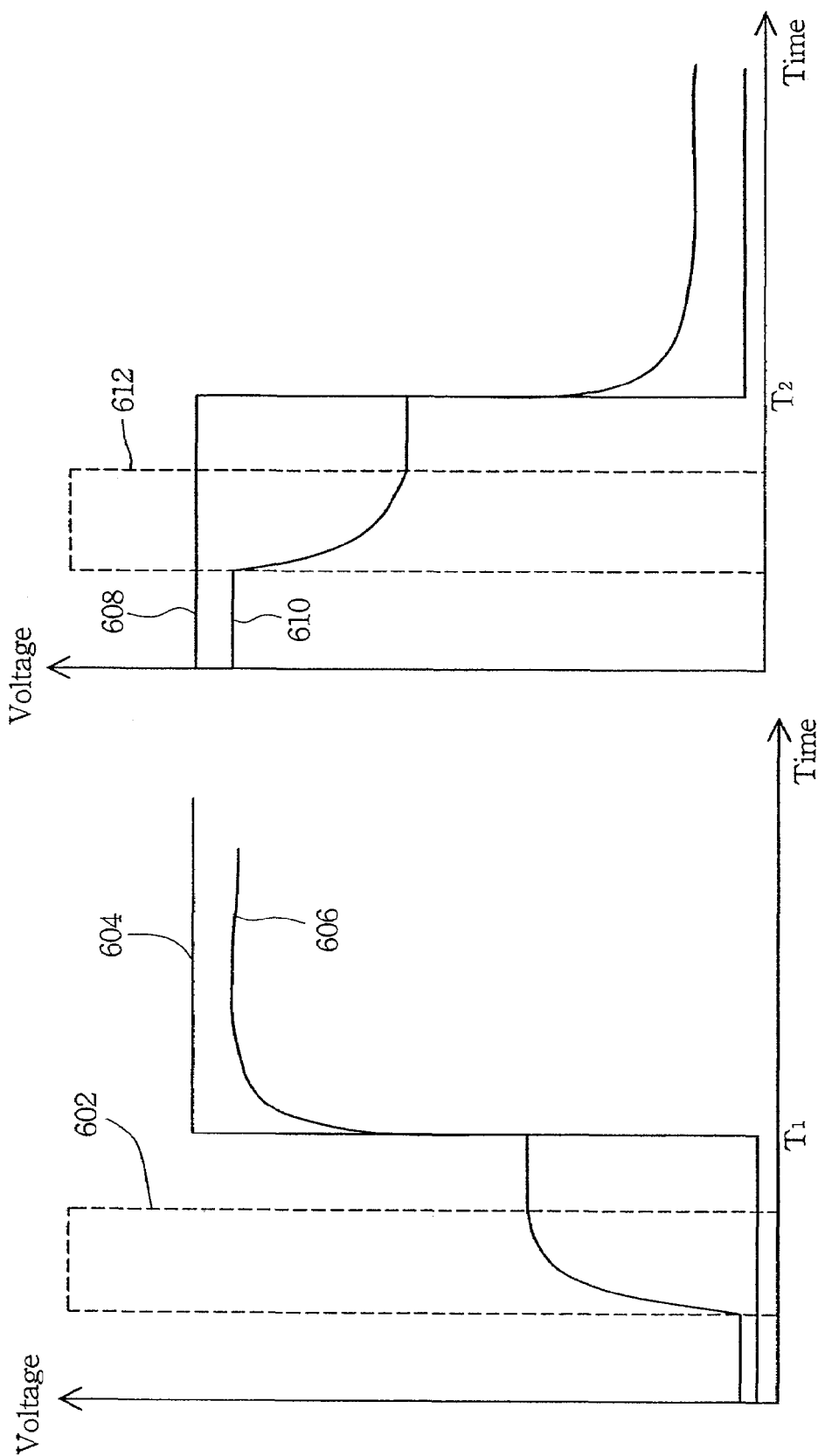

PIXEL STRUCTURE FOR LIQUID CRYSTAL DISPLAY

CROSS-REFERENCE TO RELATED APPLICATIONS

This application is a divisional of co-pending U.S. patent application Ser. No. 10/672,906, filed Sep. 25, 2003.

The disclosures of all the above-referenced prior applications, publications, and patents are considered part of the disclosure of this application, and are incorporated by reference herein.

BACKGROUND OF THE INVENTION

1. Field of the Invention

The present invention relates to a pixel structure for a liquid crystal display and more particularly to a high speed response pixel structure for a liquid crystal display.

2. Description of the Related Art

Twisted nematic (TN) cells, which at present are widely used in TFT color liquid crystal display devices (TFT/LCDs), have a small view-field angle. This results in a decrease in contrast and image inversion when an LCD panel surface is viewed from an oblique direction. Various methods have been proposed to solve this problem, i.e., to realize a wide view-field angle. Among these methods is an orientation division method in which each pixel of an LCD is divided into two parts and orientation is affected in different directions in the two parts.

However, these methods require cumbersome manufacturing steps. For example, in the case of the orientation division method, two rubbing steps are required. These steps include the further steps of coating, baking, patterning, developing and removing photoresist.

In recent years, studies on an OCB cell that is to be used as a liquid crystal cell instead of a TN cell have been made. If the OCB cell technique is used, it becomes possible to obtain a wide view-field angle more easily than with the orientation division method as well as a high-speed response characteristic that is one-order faster than with conventional TN cells.

FIG. 1 is a perspective view illustrating the structure of an OCB cell. A liquid crystal material that exhibits splay orientation 104 is sealed between two (top and bottom) glass substrates 100 and 102. Polarizing plates 106 and 108 are disposed outside the two respective glass substrates 100 and 102. When a voltage is applied to the glass substrates 100 and 102, the liquid crystal material is transformed from splay orientation 104 to bend orientation 110 as shown in FIG. 1B. In a bend orientation 110 cell, since top and bottom liquid crystal molecules are always oriented symmetrically, the view-field-angle dependence is symmetrical around the AA' line. An optically compensated bend (OCB) mode LCDs compensates for the birefringence of liquid crystal molecules so as to obtain the uniform viewing angle characteristic at all directions.

An OCB cell is in a splay orientation state when no bias voltage is applied thereto, and exhibits a bend orientation state when a given high voltage is applied thereto. To allow an OCB cell to operate as a liquid crystal display device, the cell must be transformed from a splay orientation to bend orientation at the start of operation. This process requires a restart time, which reduces the response speed.

FIG. 2A shows a pixel structure plan diagram of a thin-film transistor LCD. The gate electrode 306a of the switch transistor 306 is connected to the scan line 302. The drain electrode 306b of the switch transistor 306 is connected to the pixel electrode 308 and the source electrode 306c is connected to the video data line 304. A common line 310 is used as the common electrode of the pixel electrode 308. The switch transistor 306 is usually a thin-film transistor (TFT) that is deposited on a transparent substrate such as glass. By scanning the scan lines 302 and in accordance with the scan signals, all of the switch transistors 306 in a given scan line 302 are turned on. At the same time, video signals are provided in the video data lines synchronously with the selected scan line 302.

FIG. 2B is a cross-sectional view along the BB' line in the FIG. 2A. A liquid crystal material 326 is sealed between two (top and bottom) glass substrates 320 and 322. A conductor electrode 324 is located on the top glass substrate 320. Referring to FIG. 2A and FIG. 2B, typically, the liquid crystal molecule 328 over the pixel electrode 308 is in splay state and the liquid crystal molecule 326 over the other region is in bend state. Then, a high voltage is applied between the conductor electrode 324 and the pixel electrode 308 for a given period at the start of operation of a liquid crystal display device using the OCB cell. At this time, the liquid crystal molecule 326 in bend orientation change the orientation state of the liquid crystal molecule 328 over the pixel electrode 308 from splay orientation to bend orientation. However, a part of the liquid crystal molecule 328 over pixel electrode may be unsuccessfully transformed and remain in bend orientation, which reduces the display quality of the LCD. In addition, the two orientation states required in this method increase the manufacturing cost. Moreover, it is difficult to maintain the high angle of inclination of a bend orientation state liquid crystal molecule. Although this allows the liquid crystal display device to have a desired wide view-field angle characteristic, the image quality required for it cannot be obtained easily. Further, the above measure is not practical.

FIG. 2C shows another orientation state in accordance with the conventional method. The liquid crystal molecule 330 in the whole pixel is in splay state. In accordance with this method, a high voltage is applied between the conductor electrode 324 and the pixel electrode 308 for a given period at the start of operation of a liquid crystal display device using the OCB cell to transform the liquid crystal molecule 330 from splay state to bend state. This fixed start time usually takes more than several tens of seconds. The liquid crystal molecule 330 returns to splay state when the LCDs is turned off. However, part of the liquid crystal molecule 330, such as the liquid crystal molecule between the video data line 304 and the pixel electrode 308, is applied to the high voltage in this mode, which cause two liquid crystal molecule states when the LCDs is turned on. Yet another problem is that even if the liquid crystal molecule 330 is transformed from splay orientation to bend orientation at the start of operation, the OCB cell may return to splay orientation during operation. The LCD must be restarted for display to return to normal.

On the other hand, recent battery-driven systems such as notebook-type personal computers equipped with a TFT color liquid crystal display device are increasingly required to be of a power-saving type. To conserve power, such a liquid crystal display device has a driving mode stop function to turn off a display thereof. Once the LCD is turned off, an OCB cell returns to splay orientation from bend orientation. A period of time is needed to restore the bend orientation state; thus the display cannot be turned on instantaneously.

SUMMARY OF THE INVENTION

In accordance with the foregoing description, the typical liquid crystal display using OCB cell requires transformation of the liquid crystal molecule orientation state from splay orientation to bend orientation during operation, which involves two liquid crystal molecule orientation states. There are two typical transformation methods. In one method the liquid crystal molecule over the pixel electrode is first in a splay state while the liquid crystal molecule over the other region is in a bend state. Then, a high voltage is applied between the conductor electrode and the pixel electrode to transform the liquid crystal molecule over the pixel electrode from splay state to bend state. However, this method requires two different orientation states, splay state and bend state, and the manufacturing cost is increased. In another method, the liquid crystal molecule in the whole pixel in a splay state. Although an LCD employing this method is convenient to manufacture, this method requires a given period at the start of operation of a liquid crystal display device to transform the liquid crystal molecule from splay state to bend state. In other words, this method does not provide an instantaneous response. Moreover, part of the liquid crystal molecule does not accept high voltage, which affects the display quality.

Therefore, it is the main object of the present invention to provide a pixel structure capable of obtaining a wide viewing angle as well as improving picture quality.

Another purpose of the present invention is to provide a pixel structure only using an unique orientation state in the whole cell and for which a given period at the start of operation of a liquid crystal display device is not necessary.

Yet another purpose of the present invention is to provide a driving method of a liquid crystal display device, which method allows an OCB cell to transform from a splay orientation to a bend orientation state in a short period.

A further purpose of the present invention is to provide a liquid crystal display that can be manufactured in a simple and relatively inexpensive manufacturing method.

In accordance with the present invention, a metal electrode is built in the pixel region. The metal electrode is controlled by the common electrode. The liquid crystal molecule in the whole pixel region is in a splay state. A voltage is applied to the metal electrode to transform the liquid crystal molecule over the metal electrode from splay state to bend state during operation. Then, a voltage is applied to the pixel electrode. At this time, the liquid crystal molecule in the bend state transform the liquid crystal molecule over the pixel electrode from the splay state to the bend state. Therefore, the liquid crystal molecule in the whole pixel region exhibit the bend state.

The metal electrode can be positioned in the center of the pixel electrode or around the pixel electrode in accordance with the present invention. A complicated manufacturing process can be avoided because the present invention does not require two orientation states in a liquid crystal cell. Moreover, a given period for transforming the liquid crystal molecule from the splay state to bend state at the start of LCDs operation is not necessary. Therefore, the LCDs using the pixel structure of the present invention exhibits a high speed response as well as a high display quality.

On the other hand, the present invention also provides a drive circuit for driving the metal electrode. The drive circuit includes an inverter to invert the field frame inputted to the source/drain electrode of a transistor. The inverted field frame is used to control the common electrode. On the other hand, this transistor is controlled by a scan signal. Therefore, this transistor operation is synchronized with the switch transistor operation. In other words, if a voltage is applied in sequence to the metal electrode and the pixel electrode, the drive circuit first turns on the transistor and then inverts the field frame.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIG. 4A shows a top view of the pixel region in accordance with the second embodiment of the present invention;

FIG. 4B shows a cross-sectional view along the AA' line of FIG. 4A, wherein all of the liquid crystal molecules are in the splay state;

FIG. 5A shows a top view of the pixel region in accordance with the third embodiment of the present invention;

FIG. 5B shows a cross-sectional view from the AA' line of the FIG. 5A, wherein all of the liquid crystal molecule are in the splay state;

FIG. 6A shows a top view of the pixel region in accordance with the fourth embodiment of the present invention;

FIG. 6B shows a cross-sectional view from the AA' line of the FIG. 6A, wherein all of the liquid crystal molecules are in the splay state;

FIG. 6C shows a cross-sectional view from the AA' line of the FIG. 6A, wherein some of the liquid crystal molecules are transformed to the bend state;

FIG. 7A shows a waveform from negative to positive of drive timing in accordance with the first embodiment;

FIG. 7B shows a waveform from positive to negative of drive timing in accordance with the first embodiment;

FIG. 8A shows a waveform from negative to positive of drive timing in accordance with the second embodiment;

FIG. 8B shows a waveform from positive to negative of drive timing in accordance with the second embodiment;

DETAILED DESCRIPTION OF THE PREFERRED EMBODIMENTS

Without limiting the spirit and scope of the present invention, the circuit structure proposed in the present invention is illustrated with one preferred embodiment. One with ordinary skill in the art, upon acknowledging the embodiment, can apply the pixel electrode structure using the OCB mode and the operation method of the present invention to various liquid crystal displays. In accordance with the pixel structure, a complicated manufacturing process can be avoided because the pixel region does not require two orientation state in a liquid crystal cell. Moreover, the present invention is also not necessary to require a given period for transforming the liquid crystal molecule from the splay state to bend state at the start of LCD operation. Therefore, LCDs using the pixel structure of the present invention have a high speed response as well as a high display quality. The application of the present invention is not limited by the preferred embodiments described in the following.

In accordance with the present invention, a metal electrode is built in the pixel region. The metal electrode is controlled by the common electrode. The liquid crystal molecules in the entire pixel region are in the splay state. A voltage is applied to the metal electrode to transform the liquid crystal molecule over the metal electrode from the splay state to the bend state during operation. Then, a voltage is applied to the pixel electrode. At this time, the liquid crystal molecules in the bend state transform the liquid crystal molecule over the pixel electrode from the splay state to the bend state. Therefore, the liquid crystal molecule in the whole pixel region exhibit the bend state.

First Embodiment

Figure 1B:
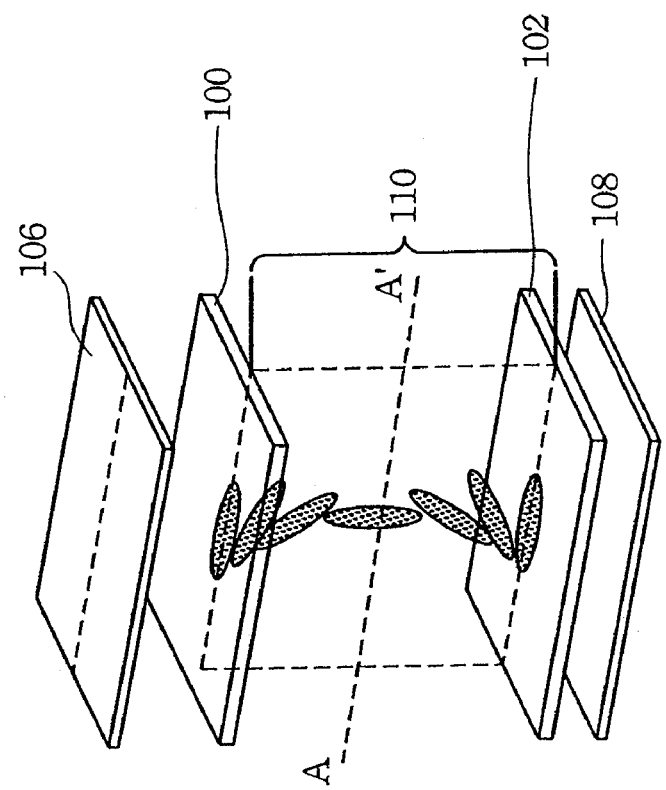
FIG. 1B shows a schematic configuration diagram of a liquid crystal display using OCB mode, wherein the liquid crystal molecule is in the bend state.
Figure 1A:
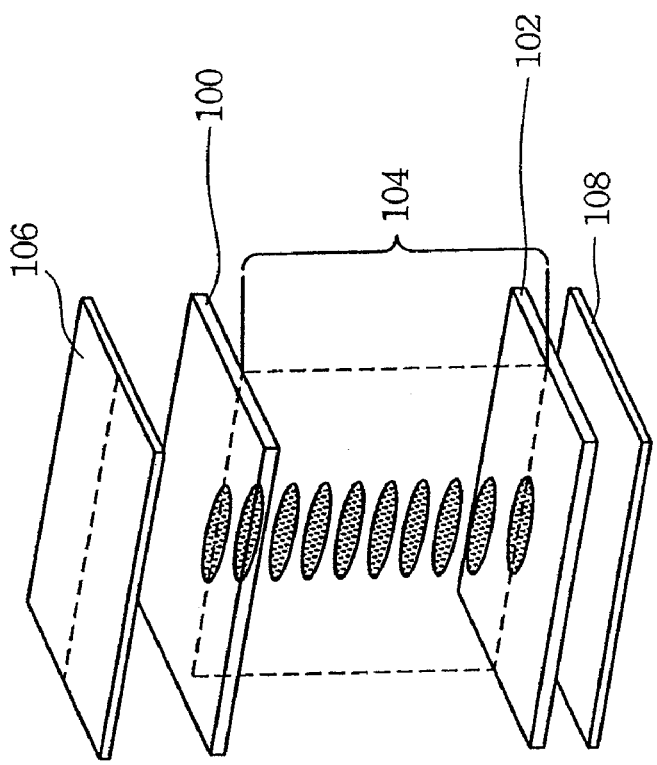
FIG. 1A shows a schematic configuration diagram of a liquid crystal display using OCB mode, wherein the liquid crystal molecule is in the splay state.
Figure 2A:
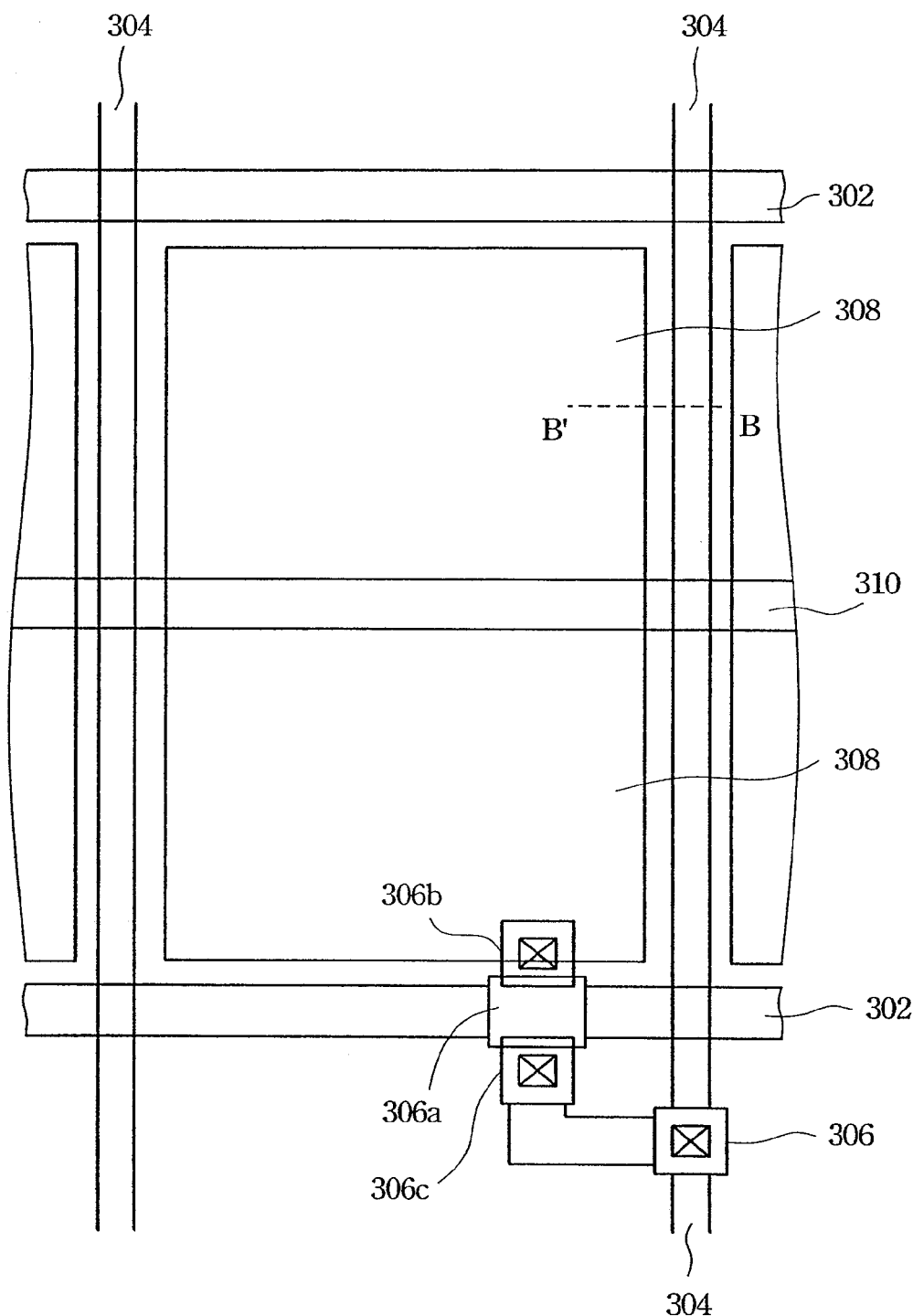
FIG. 2A shows a pixel structure plan diagram of a thin-film transistor LCD.
Figure 2B:
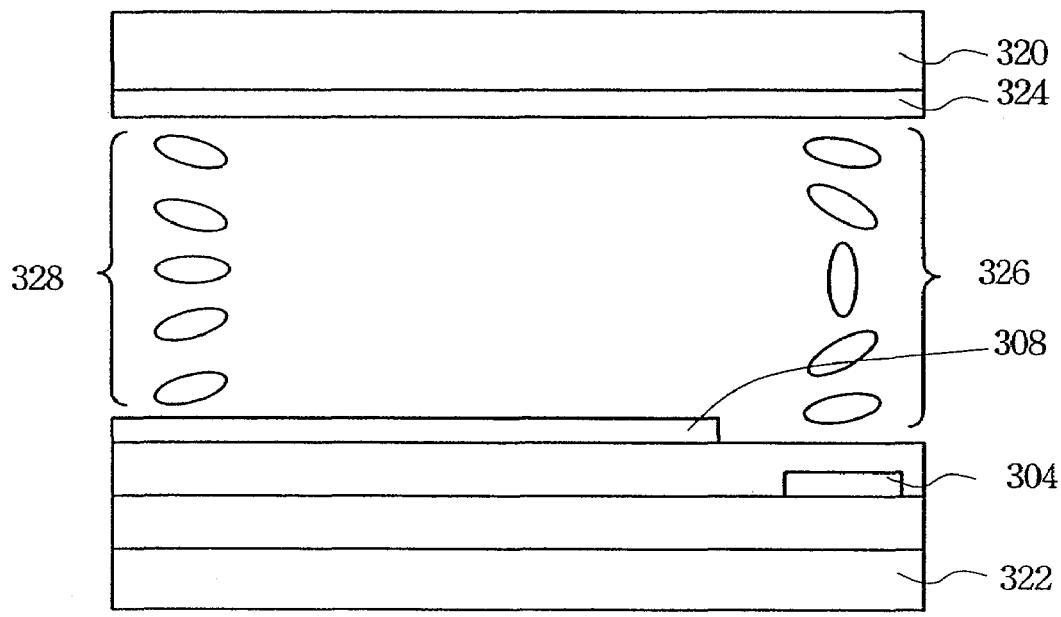
FIG. 2B shows a cross-sectional view along the BB' line of the FIG. 2A, wherein some of the liquid crystal molecules are in the splay state and some are in the bend state.
Figure 2C:
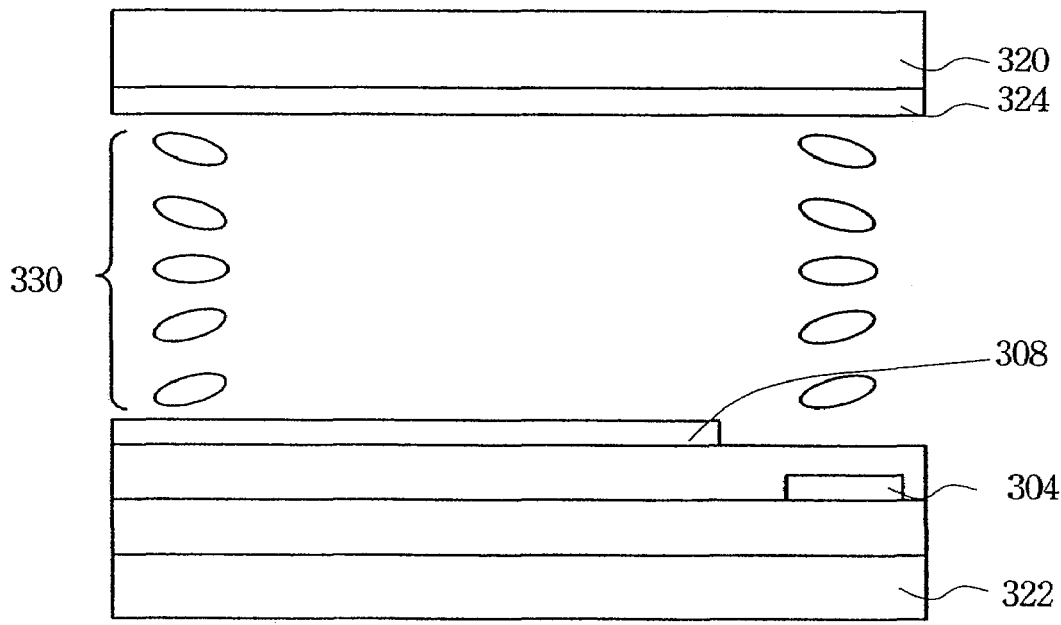
FIG. 2C shows a cross-sectional view along the BB' line of the FIG. 2A, wherein all of the liquid crystal molecules are in the splay state.
Figures 3A, 3B:
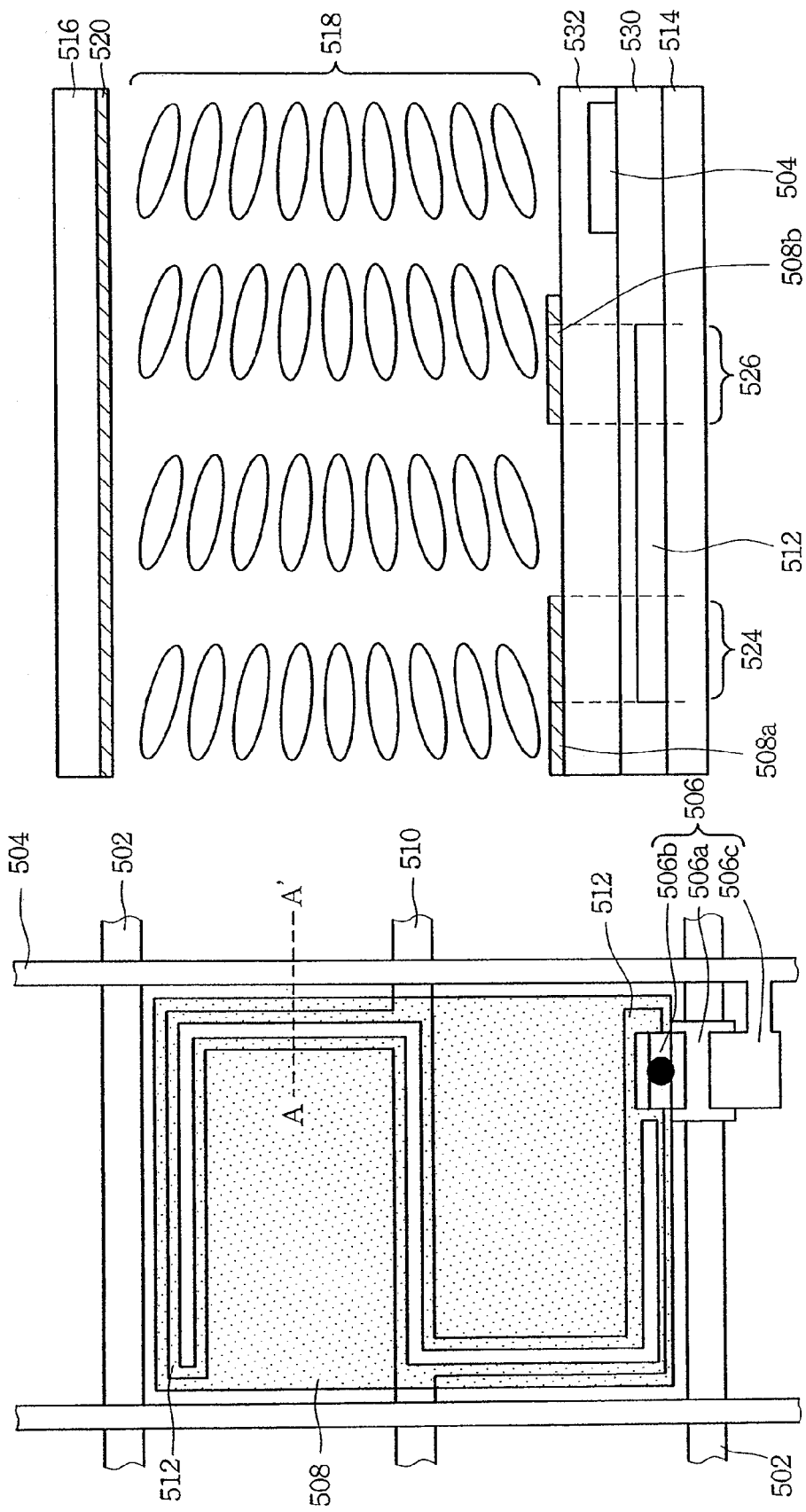
FIG. 3A shows a top view of the pixel region in accordance with the first embodiment of the present invention.
FIG. 3B shows a cross-sectional view from the AA' line of FIG. 3A, wherein all of the liquid crystal molecules are in the splay state.

FIG. 3A shows a top view of the pixel region in accordance with the first embodiment of the present invention. The silicon island 506a of the switch transistor 506 is connected with the scan line 502. When the switch transistor 506 is selected, a scan signal is sent via the scan line 502 to turn the switch transistor 506 on. The video signal in the video data line 504 is transferred to the pixel electrode 508 through the switch transistor 506. The drain electrode 506b of the switch transistor 506 is connected with the pixel electrode 508. The source electrode 506c of the switch transistor 506 is connected with the video data line 504. A common electrode line 510 is used as the common electrode of the pixel electrode 508. An "S" type metal electrode 512 is built around the pixel region. The metal electrode 512 is controlled by the common electrode line 510.

Typically, the source electrode 506c and the drain electrode 506b of the switch transistor 506 can receive video data from the video data line 504. Therefore, by scanning the scan lines 502 and in accordance with the scan signals, the switch transistors 506 in a given scan line 502 are turned on. At the same time, video signals in the video data line 504 are transferred to the pixel electrode 508 through the switch transistor 506 to show a picture on the liquid crystal display.

FIG. 3B shows a cross-sectional view along line AA' of FIG. 3A, in which all of the liquid crystal molecule are in the splay state. A lower substrate 514 and an upper substrate 516 are opposite each other with a selected distance therebetween. The lower substrate 514 and the upper substrate 516 are preferably made of a transparent insulator. A liquid crystal layer 518 having a plurality of liquid crystal molecules is sandwiched between the lower substrate 514 and the upper substrate 516, in which the plurality of liquid crystal molecules is in the splay state. The video data line 504 and the metal line 512 are sequentially formed over the lower substrate 514. An isolation layer 530 is located between the video data line 504 and the metal line 512. A pixel electrode 508 is formed on the inner surface of the lower substrate 514. Another isolation layer 532 is located between the video data line 504 and the pixel electrode 508. A conductor electrode 520 is formed on an inner surface of the upper substrate 516. Both the pixel electrode 508 and the conductor electrode 520 are formed from a transparent conductor, and preferably, for example, an ITO material. Further, alignment layers (not shown in the figure) are formed on an inner surface of the lower substrate 514 whereon the pixel electrode 508 is disposed and the upper substrate 516 whereon the conductor electrode 520 is disposed. Herein, the alignment layers have a pre-tilt angle of about 5 degrees in the splay state.

Figure 3C:
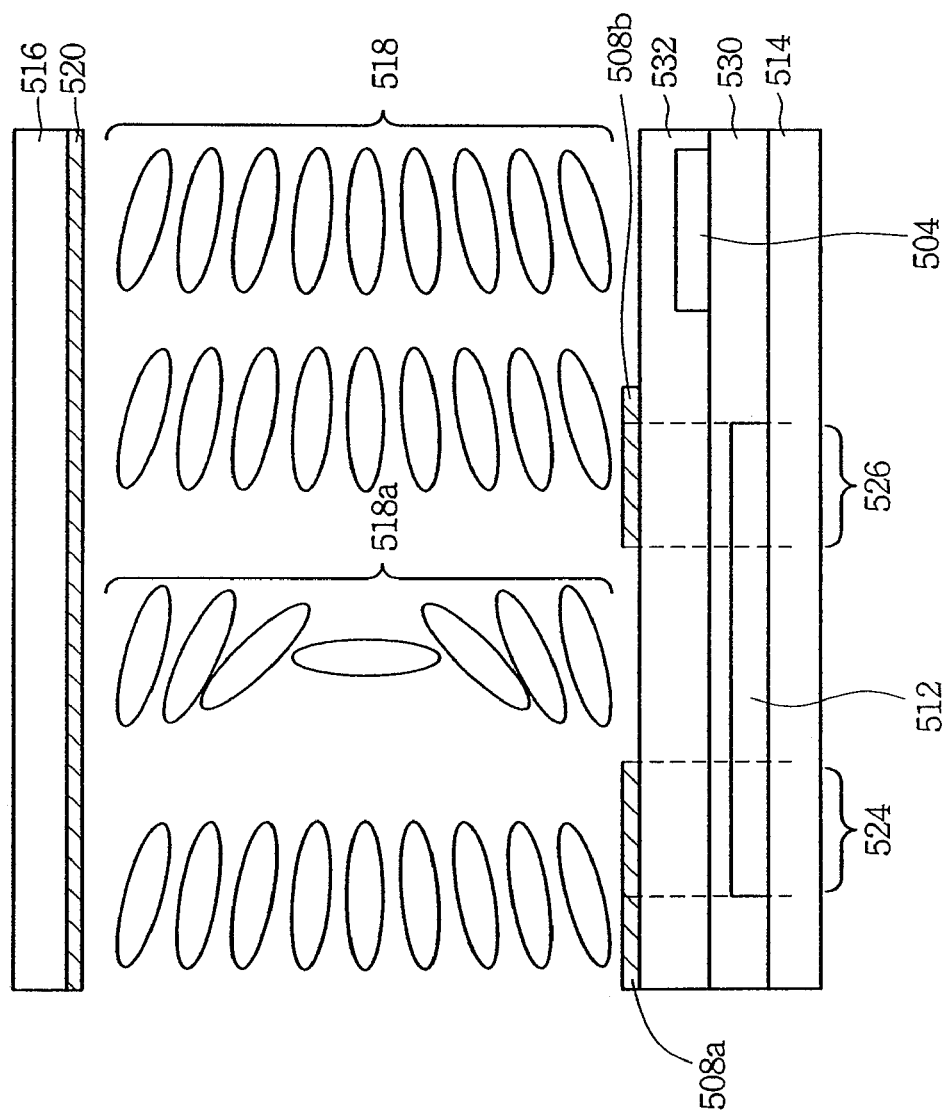
FIG. 3C shows a cross-sectional view from the AA' line of FIG. 3A, wherein some of the liquid crystal molecules are transformed to the bend state.

A voltage is applied to the metal electrode 512 to transform the liquid crystal molecule over the metal electrode 512 from the splay state to the bend state during operation as shown in FIG. 3C. FIG. 3C shows a cross-sectional view along line AA' of FIG. 3A, in which parts of the liquid crystal molecule are transformed to the bend state. In accordance with the first embodiment, a voltage is applied between the common electrode 510 and the conductor electrode 520 located on the upper substrate 516. Therefore, a voltage difference also exists between the metal electrode 512 controlled by the common electrode 510 and the conductor electrode 520. Therefore, the liquid crystal molecule between the metal electrode and the upper substrate 516 is transformed from splay state to bend state due to the voltage difference.

Further reference is made to FIG. 3C. The pixel electrode 508 is divided into two parts, 508a and 508b. A liquid crystal molecule 518a in bend state is used to divide the two parts 508a and 508b. It is noted that this liquid crystal molecule 518a has an isolating function. The voltage difference between the metal electrode 512 and the conductor electrode 520 still exists after the voltage difference between the pixel electrode and the conductor electrode 520 is created. In other words, this still-existing voltage difference ensures that the liquid crystal molecules 518a remain in the bend state. Therefore, the liquid crystal molecules 518a isolate influence from outside of the pixel electrode in which the liquid crystal molecule is in a splay state. When the liquid crystal display is turned off, the voltage applied to the common electrode 510 is removed. At this time, the liquid crystal molecule between the common electrode 510 and the metal electrode 512 is transformed from the bend state to the splay state.

Reference is yet again made to FIG. 3A again. During operation, the liquid crystal molecule between the common electrode 510 and the metal electrode 512 is first transformed from the original splay state to the bend state before a voltage is applied to pixel electrode 508. Next, by scanning the scan lines 502 and in accordance with the scan signals, the switch transistor 506 in a given scan line 502 is turned on. At the same time, video signals in the video data line 504 are transferred to the pixel electrode 508 through the switch transistor 506. In other words, a voltage difference is created between the pixel electrode 508 and the conductor electrode 520 in the upper substrate 516. At this time, the liquid crystal molecule in the pixel region are transformed from the splay state to bend state. Therefore, the liquid crystal molecules in the whole liquid crystal region sort in the bend state. On the other hand, part of the metal electrode 512 may overlap with the pixel electrode 508. The overlapping part then functions as a capacitor, which raises the response velocity of the pixel electrode.

Second Embodiment

FIG. 4A shows a top view of the pixel region in accordance with the second embodiment of the present invention. The silicon island 706a of the switch transistor 706 is connected with the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected with the pixel electrode 708. The source electrode 706c of the switch transistor 706 is connected with the video data line 704. A common electrode line 710 is used as the common electrode of the pixel electrode 708. A metal electrode 712 is built around the pixel region. The metal electrode 712 is controlled by the common electrode line 710.

FIG. 4B shows a cross-sectional view along line AA' of FIG. 4A. A lower substrate 714 and an upper substrate 716 are opposite each other with a selected distance therebetween. The lower substrate 714 and the upper substrate 716 are preferably made of a transparent insulator. A liquid crystal layer 718 having a plurality of liquid crystal molecules is sandwiched between the lower substrate 714 and the upper substrate 716, in which the plurality of liquid crystal molecules is in the splay state. The video data line 704 and the metal line 712 are sequentially formed over the lower substrate 714. An isolation layer 730 is located between the video data line 704 and the metal line 712. A pixel electrode 708 is formed on the inner surface of the lower substrate 714. Another isolation layer 732 is located between the video data line 704 and the pixel electrode 708. A conductor electrode 720 is formed on an inner surface of the upper substrate 716. Both the pixel electrode 708 and the conductor electrode 720 are formed from a transparent conductor, and preferably, for example, an ITO material. Further, alignment layers (not shown in the figure) are formed on an inner surface of the lower substrate 714 whereon the pixel electrode 708 is disposed and the upper substrate 716 whereon the conductor electrode 720 is disposed. Herein, the alignment layers have a pre-tilt angle of about 5 degrees in MARK the splay state.

Figure 4C:
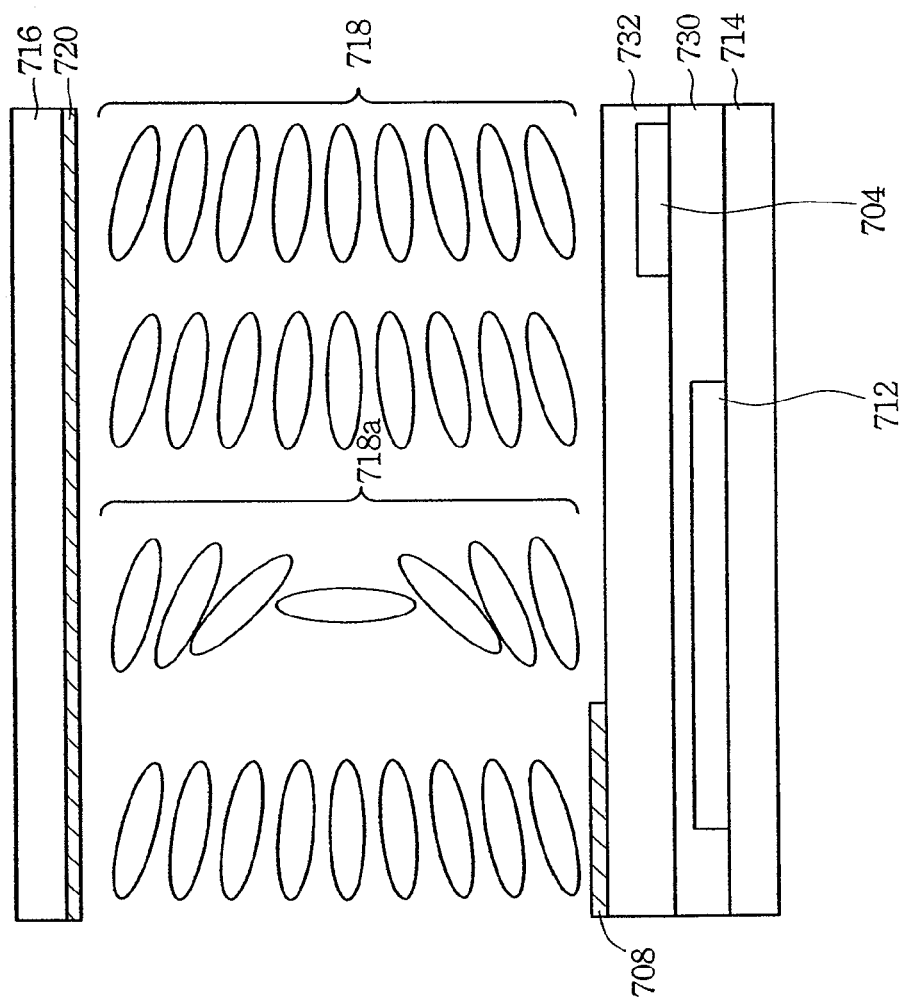
FIG. 4C shows a cross-sectional view along the AA' line of FIG. 4A, wherein some of the liquid crystal molecules are transformed to the bend state.

A voltage is applied to the metal electrode 712 to transform the liquid crystal molecule 718a over the metal electrode 712 from the splay state to the bend state during operation as shown in FIG. 4C. FIG. 4C shows a cross-sectional view along line AA' of FIG. 4A in accordance with the second embodiment, in which parts of the liquid crystal molecule are transformed to the bend state. In accordance with the second embodiment, a voltage is applied between the common electrode 710 and the conductor electrode 720 that is located on the upper substrate 716. Therefore, a voltage difference also exists between the metal electrode 712 controlled by the common electrode 710 and the conductor electrode 720. Therefore, the liquid crystal molecule between the metal electrode 712 and the upper substrate 716 is transformed from the splay state to bend state due to the voltage difference as shown in FIG. 4C.

Again referring to FIG. 4C, a liquid crystal molecule 718a which is in bend state is used to isolate the pixel electrode 708. The voltage difference between the metal electrode 712 and the conductor electrode 720 still exists after the voltage difference between the pixel electrode 708 and the conductor electrode 720 is built. In other words, this still-existent voltage difference ensures that the liquid crystal molecules 718a maintain the bend state. Therefore, the liquid crystal molecule 718a isolates the pixel electrode 708 from the influence outside of the pixel electrode 708 in which the liquid crystal molecule is in a splay state. When the liquid crystal display is turned off, the voltage applied to the common electrode 710 is removed. At this time, the liquid crystal molecule between the common electrode 710 and the metal electrode 712 can be transformed from the bend state to the splay state.

During operation, the liquid crystal molecule between the common electrode 710 and the metal electrode 712 is first transformed from the original splay state to the bend state before a voltage is applied to pixel electrode 708. Next, by scanning the scan lines 702 and in accordance with the scan signals, the switch transistor 706 in a given scan line 702 is turned on. At the same time, video signals in the video data line 704 are transferred to the pixel electrode 708 through the switch transistor 706. In other words, a voltage difference is created between the pixel electrode 708 and the conductor electrode 720 in the upper substrate 716. At this time, the liquid crystal molecule in the pixel region can be transformed from the splay state to bend state. Therefore, the liquid crystal molecules in the whole liquid crystal region are in the bend state now. On the other hand, part of the metal electrode 712 may overlap with the pixel electrode 708. The overlapping part functions as a capacitor, which raises the response velocity of the pixel electrode.

Third Embodiment

FIG. 5A shows a top view of the pixel region in accordance with the third embodiment of the present invention. The silicon island 806a of the switch transistor 806 is connected with the scan line 802. The drain electrode 806b of the switch transistor 806 is connected with the pixel electrode 808. The source electrode 806c of the switch transistor 806 is connected with the video data line 804. A common electrode line 810 is used as the common electrode of the pixel electrode 808. In accordance with the third embodiment, the metal electrode 812 and the common electrode 810 are in the shape of an "H". The metal electrode 812 is controlled by the common electrode line 810.

Figure 5C:
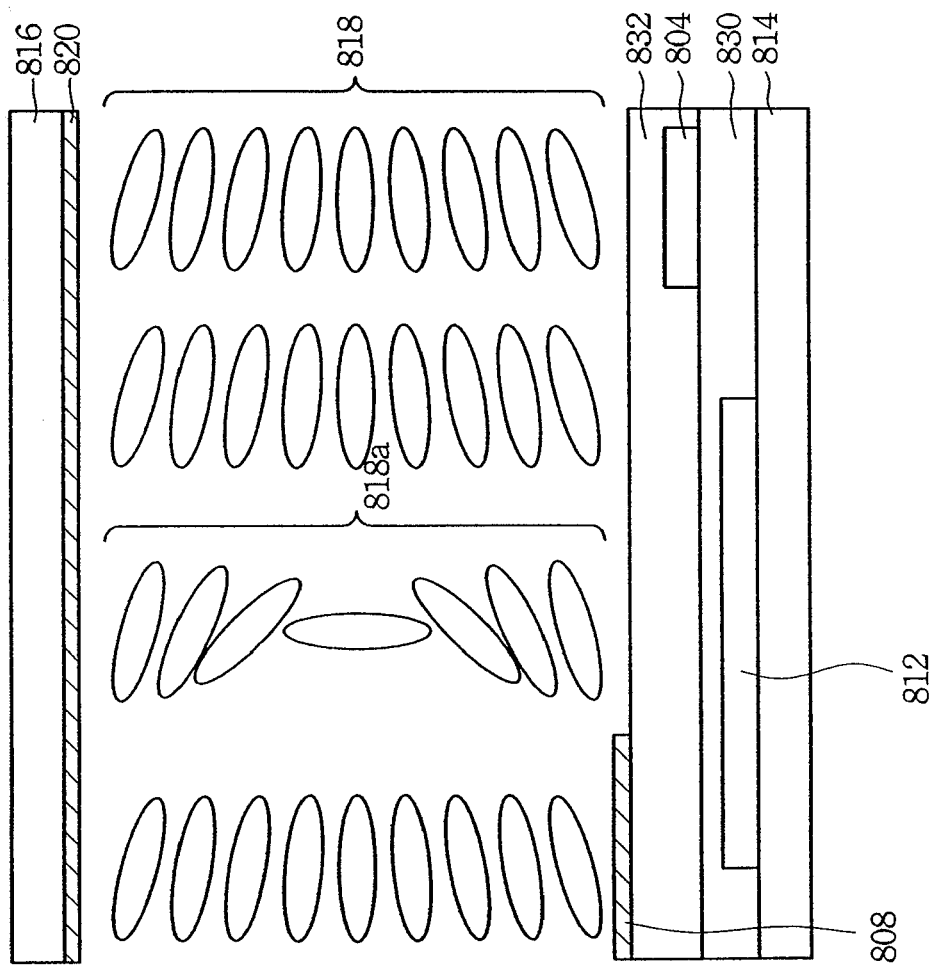
FIG. 5C shows a cross-sectional view from the AA' line of the FIG. 5A, wherein parts of the liquid crystal molecules are transformed to the bend state.

FIG. 5B shows a cross-sectional view along line AA' of FIG. 5A. A lower substrate 814 and an upper substrate 816 are opposite each other with a selected distance therebetween. The lower substrate 814 and the upper substrate 816 are preferably made of a transparent insulator. A liquid crystal layer 818 having a plurality of liquid crystal molecules is sandwiched between the lower substrate 814 and the upper substrate 816, wherein the plurality of liquid crystal molecules is in the splay state. The video data line 804 and the metal line 812 are sequentially formed over the lower substrate 814. An isolation layer 830 is located between the video data line 804 and the metal line 812. A pixel electrode 808 is formed on the inner surface of the lower substrate 814. Another isolation layer 832 is located between the video data line 804 and the pixel electrode 808. A conductor electrode 820 is formed on an inner surface of the upper substrate 816. Both the pixel electrode 808 and the conductor electrode 820 are formed from a transparent conductor, and preferably, for example, an ITO material. Further, alignment layers (not shown in the figure) are formed on an inner surface of the lower substrate 814 whereon the pixel electrode 31 is disposed and the upper substrate 816 whereon the conductor electrode 820 is disposed. Herein, the alignment layers have a pre-tilt angle of about 5 degrees in the splay state. During operation, a voltage is applied to the metal electrode 812 to transform the liquid crystal molecule 818a over the metal electrode 812 from the splay state to the bend state as shown in FIG. 5C.

Referring to FIG. 5C again, a liquid crystal molecule 818a which is in bend state is used to isolate the pixel electrode 808. In other words, the voltage difference between the metal electrode 812 and the conductor electrode 820 still exists after the voltage difference between the pixel electrode 808 and the conductor electrode 820 is created. In other words, this still-existent voltage difference ensures that the liquid crystal molecule 818a maintains the bend state. Therefore, the liquid crystal molecule 818a isolates the pixel electrode 808 from influence from outside of the pixel electrode 808 in which the liquid crystal molecules are in a splay state. When the liquid crystal display is turned off, the voltage applied to the common electrode 810 is removed. At this time, the liquid crystal molecule between the common electrode 810 and the metal electrode 812 is transformed from the bend state to the splay state.

During operation, the liquid crystal molecule between the common electrode 810 and the metal electrode 812 is first transformed from the original splay state to the bend state before a voltage is applied to pixel electrode 808. Next, by scanning the scan lines 802 and in accordance with the scan signals, the switch transistor 806 in a given scan line 802 is turned on. At the same time, video signals in the video data line 804 are transferred to the pixel electrode 808 through the switch transistor 806. In other words, a voltage difference is built between the pixel electrode 808 and the conductor electrode 820 in the upper substrate 816. At this time, the liquid crystal molecule in the pixel region can be transformed from splay state to bend state. Therefore, the liquid crystal molecule in the whole liquid crystal region is now in the bend state. On the other hand, part of the metal electrode 812 overlaps the pixel electrode 808. The overlapping part functions as a capacitor, which can raise the response velocity of the pixel electrode.

Fourth Embodiment

Referring to FIG. 6A, it shows a top view of the pixel region in accordance with the fourth embodiment of the present invention. The silicon island 906a of the switch transistor 906 is connected with the scan line 902. The drain electrode 906b of the switch transistor 906 is connected with the pixel electrode 908. The source electrode 906c of the switch transistor 906 is connected with the video data line 904. A common electrode line 910 is used as the common electrode of the pixel electrode 909. In accordance with the fourth embodiment, the metal electrode 912 and the common electrode 910 are in the shape of a cross. The metal electrode 912 is controlled by the common electrode line 910.

FIG. 6B shows a cross-sectional view along line AA' of FIG. 5A. A lower substrate 914 and an upper substrate 916 are opposite each other with a selected distance therebetween. The lower substrate 914 and the upper substrate 916 are preferably made of a transparent insulator. A liquid crystal layer 918 having a plurality of liquid crystal molecules is sandwiched between the lower substrate 914 and the upper substrate 916, wherein the plurality of liquid crystal molecules is in the splay state. The video data line 904 and the metal line 912 are sequentially formed over the lower substrate 914. An isolation layer 930 is located between the video data line 904 and the metal line 912. A pixel electrode 908 is formed on the inner surface of the lower substrate 914. Another isolation layer 932 is located between the video data line 904 and the pixel electrode 908. A conductor electrode 920 is formed on an inner surface of the upper substrate 916. Both the pixel electrode 908 and the conductor electrode 920 are formed from a transparent conductor, and preferably, for example, an ITO material. Further, alignment layers (not shown in the figure) are formed on an inner surface of the lower substrate 914 whereon the pixel electrode 31 is disposed and the upper substrate 916 whereon the conductor electrode 920 is disposed. Herein, the alignment layers have a pre-tilt angle of about 5 degrees in the splay state.

Referring to FIG. 5C again, a liquid crystal molecule 918a which is in bend state is used to isolate the pixel electrode 908. In other words, the voltage difference between the metal electrode 912 and the conductor electrode 920 still exists after the voltage difference between the pixel electrode 908 and the conductor electrode 920 is built. This still-existent voltage difference ensures that the liquid crystal molecule 918a maintains the bend state. Therefore, the liquid crystal molecule 918a isolates pixel electrode 908 from the influence the outside of the pixel electrode 908 in which the liquid crystal molecule is in a splay state. When the liquid crystal display is turned off, the voltage applied to the common electrode 910 is removed. At this time, the liquid crystal molecule between the common electrode 910 and the metal electrode 912 may be transformed from the bend state to the splay state.

During operation, the liquid crystal molecule between the common electrode 910 and the metal electrode 912 is first transformed from the original splay state to the bend state before a voltage is applied to pixel electrode 909. Next, by scanning the scan lines 902 and in accordance with the scan signals, the switch transistor 906 in a given scan line 902 is turned on. At the same time, video signals in the video data line 904 are transferred to the pixel electrode 908 through the switch transistor 906. In other words, a voltage difference is created between the pixel electrode 908 and the conductor electrode 920 in the upper substrate 916. At this time, the liquid crystal molecules in the pixel region are transformed from the splay state to bend state. Therefore, the liquid crystal molecules in the whole liquid crystal region are now in the bend state. On the other hand, part of the metal electrode 912 overlaps with the pixel electrode 908. The overlapping part functions as a capacitor, which can raise the response velocity of the pixel electrode.

In accordance with the foregoing description, an additional metal electrode is built in the pixel region. The metal electrode is controlled by the common electrode. The liquid crystal molecules in the whole pixel region are in the splay state. During operation, a voltage is first applied to the metal electrode to transform the liquid crystal molecule over the metal electrode from the splay state to the bend state. Then, a voltage is applied to the pixel electrode to make the whole pixel region exhibit the bend state.

It is noted that the metal electrode can be positioned in the center of the pixel electrode or around the pixel electrode. The metal electrode and the common electrode can be in the shape of a cross or in the sharp of an "H". In accordance with the present invention, a complicated manufacturing process is avoided because the present invention does not require two orientation states in a liquid crystal cell. Moreover, a given period for transforming the liquid crystal molecule from the splay state to bend state at the start of LCDs operation is not necessary. Therefore, the LCDs using the pixel structure of the present invention has a high speed response as well as a high display quality.

On the other hand, the present invention also provides a drive circuit for driving the metal electrode. FIG. 7A shows a waveform from negative to positive of drive timing in accordance with the first embodiment. The waveform can be used in the foregoing four embodiments. According to the FIGS. 3A to 3C and the FIG. 7A, a voltage signal 404 is first applied to the common electrode 510. Therefore, the metal electrode 512 controlled by the common electrode is also applied by this voltage signal 404. At this time, the liquid crystal molecule located over the metal electrode 512 is transformed from the splay state to bend state. On the other hand, part of the metal electrode 512 overlaps with the pixel electrodes 508a and 508b and a voltage exists in the metal electrode 512 as shown in the FIGS. 3B and 3C. All of the metal electrode and pixel electrodes 508a and 508b are conductors. Therefore, the overlapping parts 524 and 526 can function as capacitors. In other words, this voltage applied to the metal electrode 512 charges these overlapping parts 524 and 526 to raise the electrical potential of the pixel electrode.

At time $T_1$, by scanning the scan lines 502 and in accordance with the scan signals 402, the switch transistor 506 in a given scan line 502 is turned on. At the same time, pixel electrical potential 406 in the video data line 504 is transferred to the pixel electrode 508 through the switch transistor 506. In other words, a voltage difference is created between the pixel electrode 508 and the conductor electrode 520 in the upper substrate 516 to transform the liquid crystal molecule from the splay state to the bend state. It is noted that because the overlapping parts 524 and 526 function as a capacitor function, an initial electric potention exists in the pixel electrode 508. In other words, it is easier to create a voltage in the pixel electrode 508 for transforming the liquid crystal molecule from the splay state to bend state. Therefore, the response velocity can be raised.

FIG. 7B shows a waveform from positive to negative of drive timing. The waveform may be used in the foregoing four embodiments. According to FIGS. 3A to 3C and the FIG. 7B, a voltage signal 408 applied to the common electrode 510 is first switched from a high voltage to a low voltage. Therefore, the metal electrode 512 controlled by the common electrode is also in a low voltage state. On the other hand, part of the metal electrode 512 overlaps with the pixel electrodes 508a and 508b as shown in the FIGS. 3B and 3C. All of the metal electrode, pixel electrodes 508a and 508b are conductors. Therefore, the overlapping parts 524 and 526 function as a capacitor. Therefore, when the metal electrode 512 is in a low electrical potential, the electrical potential 410 of the pixel electrodes 508a and 508b is also reduced to a special value at time $T_2$. However, because the scan signal 412 does not select the switch transistor 506 at this time, the switch transistor 506 is still turned off. In other words, the electrical potential 410 of the pixel electrodes 508a and 508b is maintained at a fixed value. At time $T_3$, when the scan signal 412 in the scan line 502 selects the switch transistor 506, the switch transistor 506 is turned on. The potential of the pixel electrodes 508a and 508b is discharged through the switch transistor 506 to reduce the electrical potential 410.

FIG. 8A and FIG. 8B are the waveforms in accordance with the second embodiment, in which FIG. 8A shows a waveform from positive to negative of drive timing. The waveform may be used in the foregoing four embodiments. According to the FIGS. 3A to 3C and the FIG. 8A, by scanning the scan lines 502 and in accordance with the scan signals 602, the switch transistor 506 in a given scan line 502 is turned on. At the same time, pixel electrical potential 606 in the video data line 504 is transferred to the pixel electrode 508 through the switch transistor 506. Next, at time $T_1$, a voltage signal 604 is transformed from a low electrical potential to a high electrical potential. In other words, the common electrode is also in a high electrical potential. Therefore, the metal electrode 512 controlled by the common electrode 510 is also in a high electrical potential that transforms the liquid crystal molecule from the splay state to the bend state.

On the other hand, part of the metal electrode 512 overlaps with the pixel electrodes 508a and 508b and a voltage exists in the metal electrode 512 as shown in the FIGS. 3B and 3C. All of the metal electrode and pixel electrodes 508a and 508b are conductors. Therefore, the overlapping parts 524 and 526 function as a capacitor. In other words, this voltage applied to the metal electrode 512 charges these overlapping parts 524 and 526 to raise the electrical potential 606 of the pixel electrode. It is easier to create a voltage in the pixel electrode 508 for transforming the liquid crystal molecule from the splay state to bend state.

FIG. 8B shows waveform from positive to negative of drive timing in accordance with the second embodiment. The waveform may be used in the foregoing four embodiments. According to the FIGS. 3A to 3C and the FIG. 8B, by scanning the scan lines 502 and in accordance with the scan signals 612, the switch transistor 506 in a given scan line 502 is turned on to reduce the pixel electrical potential 610. On the other hand, part of the metal electrode 512 overlaps with the pixel electrodes 508a and 508b as shown in the FIGS. 3B and 3C. The overlapping parts 524 and 526 function as a capacitor. This capacitor function maintain the pixel electrical potential of the pixel electrode 508 at a fixed value. At time $T_2$, the voltage signal 608 in the common electrode 510 is transferred from a high electrical potential to a low electrical potential. The metal electrode 512 controlled by the common electrode 510 is also in a low electrical potential, which discharges the charge storing in the overlapping parts 524 and 526 to reduce the pixel electrical potential 610 of the pixel electrode 508.

Figure 9B:
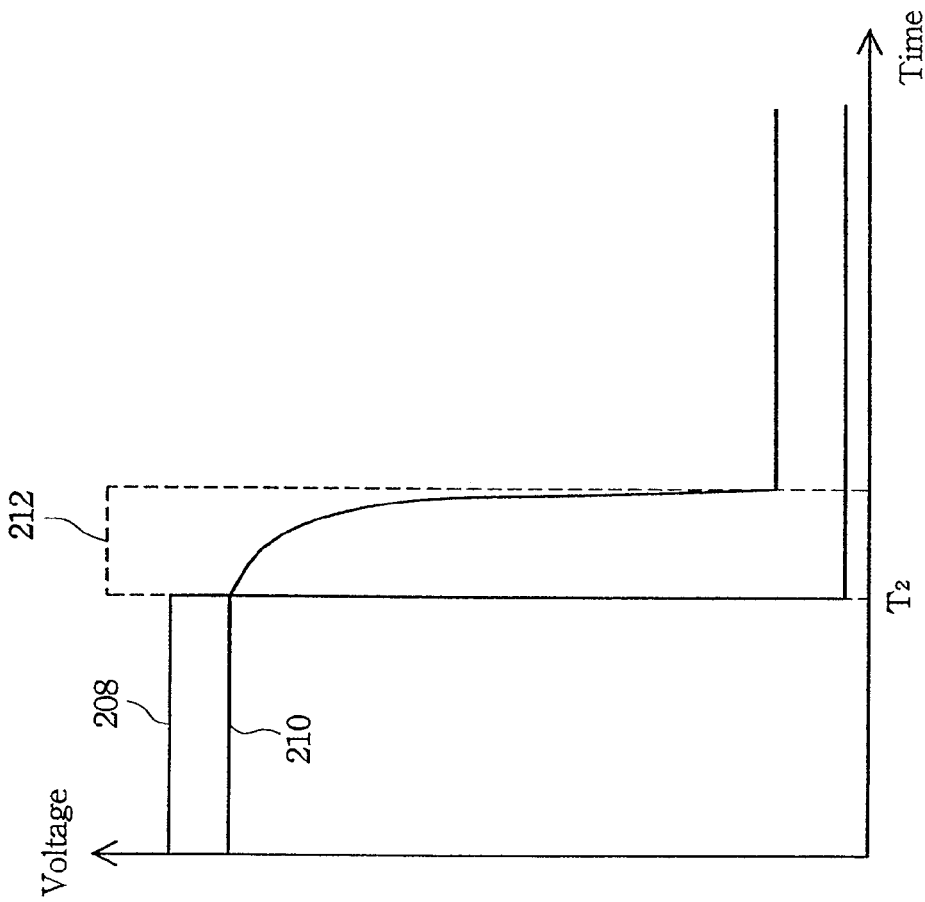
FIG. 9B shows a waveform from positive to negative of drive timing in accordance with the third embodiment.
Figure 9A:
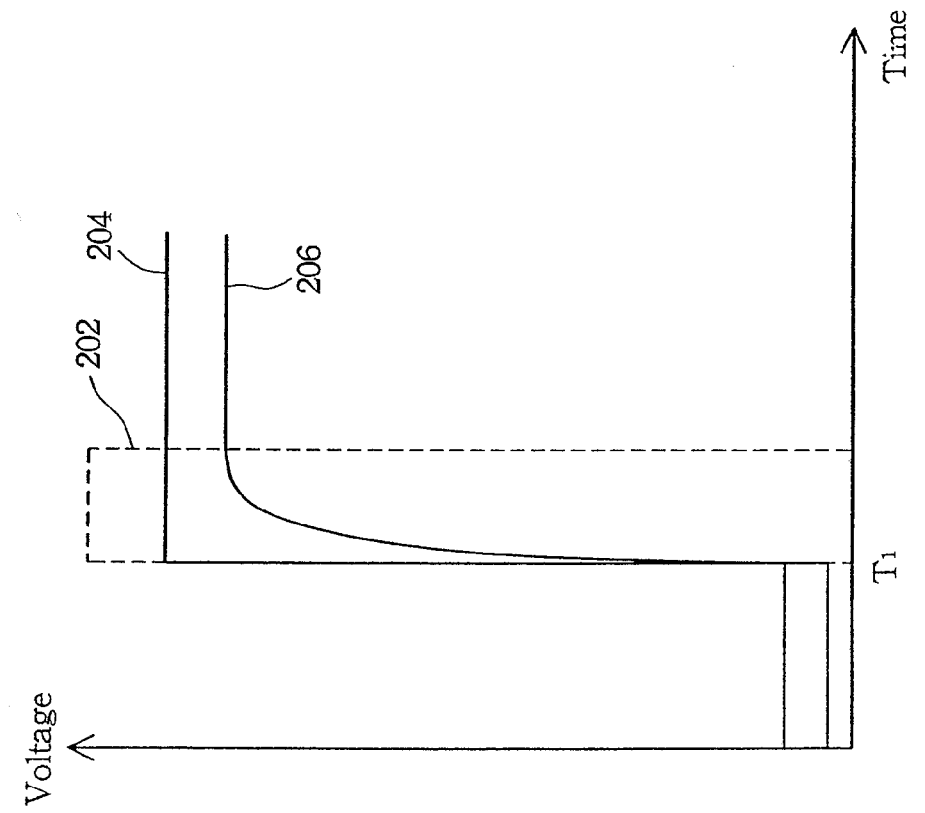
FIG. 9A shows a waveform from negative to positive of drive timing in accordance with the third embodiment.

FIG. 9A and FIG. 9B are the waveforms in accordance with the third embodiment, in which FIG. 9A shows a waveform from positive to negative of drive timing. The waveform may be used in the foregoing four embodiments. According to the FIGS. 3A to 3C and the FIG. 9A, by scanning the scan lines 502 and in accordance with the scan signals 202, the switch transistor 506 in a given scan line 502 is turned on at time $T_1$. Next, pixel electrical potential 206 in the video data line 504 is transferred to the pixel electrode 508 through the switch transistor 506. At the same time, a voltage signal 204 is transformed from a low electrical potential to a high electrical potential. In other words, the common electrode is also in a high electrical potential. Therefore, the metal electrode 512 controlled by the common electrode 510 is also in a high electrical potential to transform the liquid crystal molecule from the splay state to the bend state.

On the other hand, part of the metal electrode 512 overlaps with the pixel electrodes 508a and 508b as shown in FIGS. 3B and 3C. All of the metal electrode, pixel electrodes 508a and 508b are conductors. The overlapping parts 524 and 526 function as a capacitor. Therefore, this voltage applied to the metal electrode 512 charges these overlapping parts 524 and 526 to raise the electrical potential 26 of the pixel electrode. It is easier to build a voltage in the pixel electrode 508 for transforming the liquid crystal molecule from the splay state to bend state.

FIG. 9B shows a waveform from positive to negative of drive timing in accordance with the third embodiment. The waveform may be used in the foregoing four pixel structure embodiments. According to the FIGS. 3A to 3C and the FIG. 8B, by scanning the scan lines 502 and in accordance with the scan signals 212, the switch transistor 506 in a given scan line 502 is turned on to reduce the pixel electrical potential 210 at time $T_2$. At this time, the voltage signal 208 in the common electrode 510 is transformed from a high electrical potential to a low electrical potential. The metal electrode 512 controlled by the common electrode 510 is also at a low electrical potential. On the other hand, part of the metal electrode 512 overlaps with the pixel electrodes 508a and 508b as shown in the FIGS. 3B and 3C. The overlapping parts 524 and 526 function as a capacitor. Because the electrical potential in the common electrode 510 is at a low electrical potential, the charge storing in the overlapping parts 524 and 526 are discharged to reduce the pixel electrical potential 210 of the pixel electrode 508.

In accordance with the pixel structure of the present invention, part of the metal electrode overlaps with the pixel electrodes to function as a capacitor, which raises the response velocity.

Figure 10:
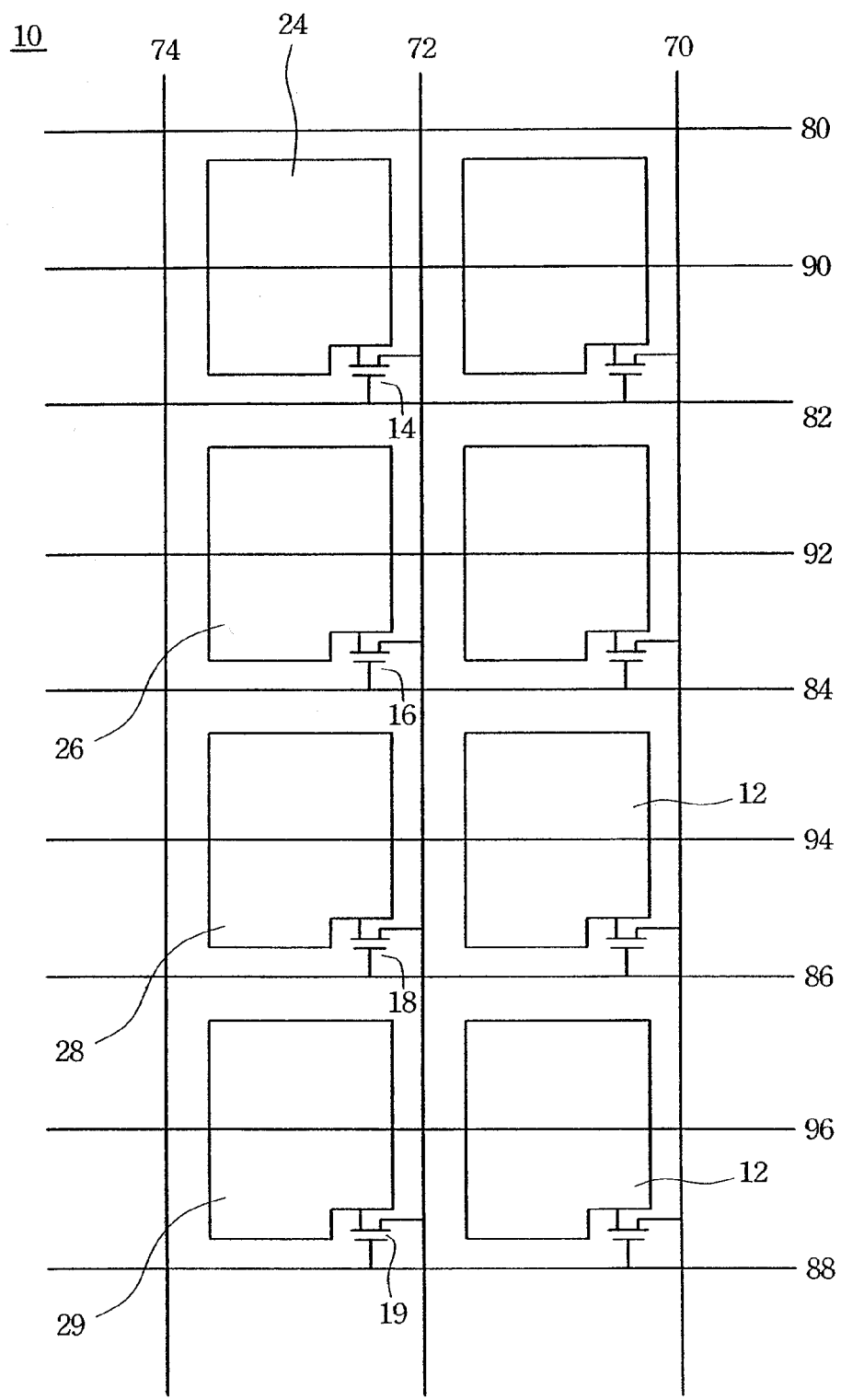
FIG. 10 shows a top view of using the pixel electrode structure of the present invention to a TFT-LCDs.

FIG. 10 shows a top view of using the pixel electrode structure of the present invention in a TFT-LCD, in which the foregoing four pixel structures may be used in the embodiment. The gate electrodes of the switch transistors 14, 16, 18 and 19 are respectively connected to the scan lines 82, 84, 86 and 88. The drain electrodes of the switch transistor 14, 16, 18 and 19 are respectively connected to the pixel electrodes 24, 26, 28 and 19 and the source electrodes are respectively connected to the video data line 72. The common lines 90, 92, 94 and 96 are used as the common electrode of the pixel electrode 24, 26, 28 and 19, respectively, to control the metal electrodes (not shown in the figure). When the switch transistor 14 is selected by a given scan line, the video signals provided in the video data lines 72 are transferred to the pixel electrode 24 through the switch transistor 14 to show a picture in the display.

Figure 11A:
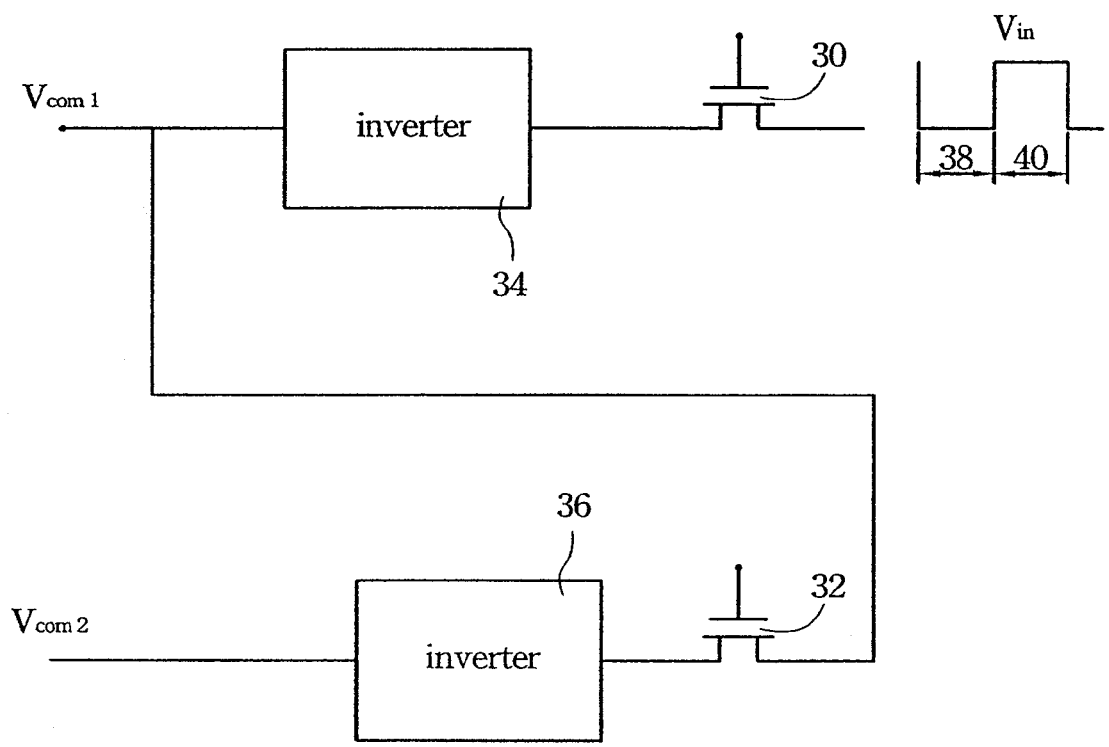
FIG. 11A shows a drive circuit schematic diagram for generating a drive voltage.

FIG. 11A shows a drive circuit schematic diagram for generating a waveform as shown in the FIGS. 7A and 7B for application to the pixel structure as shown in FIG. 10. It is noted that FIG. 11A only depicts the common electrode for driving two different pixel electrodes. However, this drive circuit may be expanded for driving all the pixel structure. The drive method is same as the described in the following.

Referring to FIG. 10 and FIG. 11A, in accordance with the drive circuit of the present invention, the voltage signal in the output end $V_{com1}$ is used to drive the common electrode 92 and the voltage signal in the output end $V_{com2}$ is used to drive the common electrode 94. The switch of transistor 30 is controlled by the scan line 82 and the switch of transistor 32 is controlled by the scan line 84. An inverter 34 is located between the transistor 30 and the output end $V_{com1}$ to invert the input signal from the transistor 30. Another inverter 36 is located between the transistor 32 and the output end $V_{com2}$ to invert the signal in the output end $V_{com1}$.

During operation, a frame signal $V_{in}$ composed of two fields 38 and 40 is input from the transistor 30, in which the time of each field is 1/60 second. When the transistor 30 is turned on by the scan line 82, the first field signal 38 is transferred to the inverter 34 through the transistor 30. The inverter 34 inverts the first field signal 38 and sends out the inverted first field signal 38 from the output end $V_{com1}$ to drive the common electrode 92. Next, when the scan line 84 turns on the transistor 32, the inverted first field signal 38 is transferred to the inverter 36 through the transistor 32. The inverter 36 inverts the received signal again and sends out the same from the output end $V_{com2}$ to drive the common electrode 94.

Therefore, in accordance with the waveform generated by the drive circuit of the present invention, the switch transistor 16 of the pixel electrode 26 is turned on by the scan signal in the scan line 84 after the common electrode 92 is driven by the drive signal from the output end $V_{com1}$. Therefore, the waveform shown in the FIG. 7A is formed, in which the waveform 404 is the signal in the output end $V_{com1}$ and the waveform 402 is the signal in the scan line 84.

Next, when the transistor 30 receives the signal in the scan line 82 again, the second field signal 40 is transferred to the inverter 34 through the transistor 30. The inverter 34 may invert the second field signal 40 and sends out the inverted second field signal 40 from the output end $V_{com1}$ to drive the common electrode 92. Next, when the scan line 84 turns on the transistor 32, the inverted second field signal 40 is transferred to the inverter 36 through the transistor 32. The inverter 36 inverts the received signal again and sends out the same from the output end $V_{com2}$ to drive the common electrode 94.

Therefore, the switch transistor 16 of the pixel electrode 26 is turned on by the scan signal in the scan line 84 after the common electrode 92 receives the signal from the output end $V_{com1}$. The waveform shown in the FIG. 7B is thus formed, in which the waveform 408 is the signal in the output end $V_{com1}$ and the waveform 412 is the signal in the scan line 84.

Figure 11B:
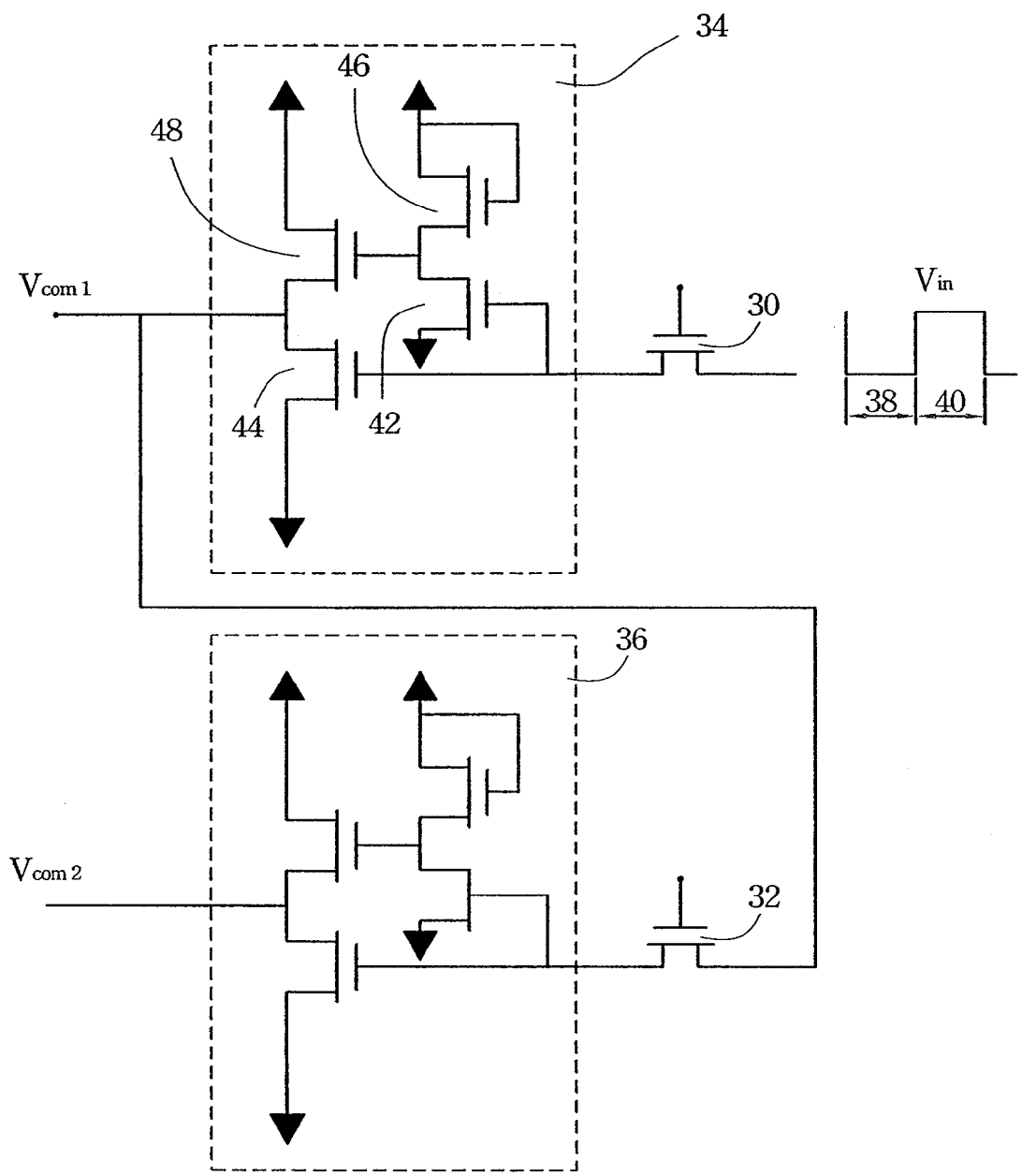
FIG. 11B shows a detailed diagram of a drive circuit for generating a drive voltage.

FIG. 11B shows a detailed diagram of a drive circuit for generating a drive voltage. The operation method of the inverter is described in the following. When the transistor 30 is turned on by the signal in the scan line 82, the first field signal 38 is transferred to the gate electrodes of the transistors 42 and 44 through the transistor 30. The transistors 42 and 44 are still turned off because the first field signal 38 is at a low electrical potential. The transistor is turned on because the drain electrode and the source electrode are connected together. The transistor is also turned on by the high voltage through the transistor 46. Therefore, the signal in the output end $V_{com1}$ is a high voltage signal.

Similarly, when the signal in the scan line 82 turn on the transistor 30 again, the second field signal 40 is transferred to the gate electrodes of the transistors 42 and 44 through the transistor 30. The transistors 42 and 44 are turned on because the second field signal 40 is at a high electrical potential. The gate electrode of the transistor 48 are connected to the low electrical potential through the transistor 42. Therefore, the transistor 48 is turned off. Therefore, the output end $V_{com1}$ is connected to a low voltage signal through the transistor 44.

The drive circuit shown in FIG. 11A also can be used to generate a waveform as shown in FIGS. 8A and 8B. Referring to FIG. 10 and FIG. 11A together, the voltage signal in the output end $V_{com1}$ is used to drive the common electrode 92 and the voltage signal in the output end $V_{com2}$ is used to drive the common electrode 94. However, the switch of the transistor 30 is controlled by the scan line 86 and the switch of the transistor 32 is controlled by the scan line 88. An inverter 34 is located between the transistor 30 and the output end $V_{com1}$ to invert the input signal from the transistor 30. Another inverter 36 is located between the transistor 32 and the output end $V_{com2}$ to invert the signal in the output end $V_{com1}$.

During operation, a frame signal $V_{in}$ that is composed of two fields 38 and 40 is input from the transistor 30, in which the time of each field is 1/60 seconds. When the transistor 30 is turned on by the scan signal in the scan line 86, the first field signal 38 is transferred to the inverter 34 through the transistor 30. The inverter 34 inverts the first field signal 38 and sends out the inverted first field signal 38 from the output end $V_{com1}$ to drive the common electrode 92. Next, when the scan line 88 turns on the transistor 32, the inverted first field signal 38 is transferred to the inverter 36 through the transistor 32. The inverter 36 inverts the received signal again and sends out the same from the output end $V_{com2}$ to drive the common electrode 94.

Therefore, in accordance with the waveform generated by the drive circuit of the present invention, the common electrode 92 is driven by the drive signal from the output end $V_{com1}$ after the switch transistor 18 of the pixel electrode 28 is turned on by the scan signal in the scan line 86. Therefore, the waveform shown in the FIG. 8A is formed, in which the waveform 604 is the signal in the output end $V_{com2}$ and the waveform 602 is the signal in the scan line 86.

Next, when the transistor 30 receives the signal in the scan line 86 again, the second field signal 40 is transferred to the inverter 34 through the transistor 30. The inverter 34 inverts the second field signal 40 and sends out the inverted second field signal 40 from the output end $V_{com1}$ to drive the common electrode 92. Next, when the scan line 88 turns on the transistor 32, the inverted second field signal 40 is transferred to the inverter 36 through the transistor 32. The inverter 36 inverts the received signal again and sends out the same from the output end $V_{com2}$ to drive the common electrode 94.

Therefore, the common electrode 94 receives the signal from the output end $V_{com2}$ after the switch transistor 18 of the pixel electrode 28 is turned on by the scan signal in the scan line 86. The waveform shown in the FIG. 8B is thus formed, in which the waveform 608 is the signal in the output end $V_{com2}$ and the waveform 612 is the signal in the scan line 86.

The drive circuit showing in the FIG. 11A also can be used to generate a waveform as shown in FIGS. 9A and 9B. Referring to FIG. 10 and FIG. 11A together, the voltage signal in the output end $V_{com1}$ is used to drive the common electrode 92 and the voltage signal in the output end $V_{com2}$ is used to drive the common electrode 94. However, the switch of the transistor 30 is controlled by the scan line 84 and the switch of the transistor 32 is controlled by the scan line 86. An inverter 34 is located between the transistor 30 and the output end $V_{com1}$ to invert the input signal from the transistor 30. Another inverter 36 is located between the transistor 32 and the output end $V_{com2}$ to invert the signal in the output end $V_{com1}$.

During operation, a frame signal $V_{in}$ composed of two fields 38 and 40 is input from the transistor 30, in which the time of each field is 1/60 second. When the transistor 30 is turned on by the scan signal in the scan line 84, the first field signal 38 is transferred to the inverter 34 through the transistor 30. The inverter 34 inverts the first field signal 38 and sends out the inverted first field signal 38 from the output end $V_{com1}$ to drive the common electrode 92. Next, when the scan line 86 turns on the transistor 32, the inverted first field signal 38 is transferred to the inverter 36 through the transistor 32. The inverter 36 inverts the received signal again and sends out the same from the output end $V_{com2}$ to drive the common electrode 94.

Therefore, in accordance with the waveform generated by the drive circuit of the present invention, the switch transistor 16 of the pixel electrode 26 is turned on by the scan signal in the scan line 84. At the same time, the common electrode 92 is driven by the drive signal from the output end $V_{com1}$. The waveform shown in the FIG. 9A is thus formed, in which the waveform 204 is the signal in the output end $V_{com1}$ and the waveform 202 is the signal in the scan line 84.

Next, when the transistor 30 receives the signal in the scan line 84 again, the second field signal 40 is transferred to the inverter 34 through the transistor 30. The inverter 34 inverts the second field signal 40 and sends out the inverted second field signal 40 from the output end $V_{com1}$ to drive the common electrode 92. Next, when the scan line 86 turns on the transistor 32, the inverted second field signal 40 is transferred to the inverter 36 through the transistor 32. The inverter 36 inverts the received signal again and sends out the same from the output end $V_{com2}$ to drive the common electrode 94.

Therefore, the switch transistor 16 of the pixel electrode 26 is turned on by the scan signal in the scan line 84. At the same time, the common electrode 92 receives the signal from the output end $V_{com1}$. The waveform shown in the FIG. 9B is thus formed, in which the waveform 208 is the signal in the output end $V_{com2}$ and the waveform 212 is the signal in the scan line 84.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A liquid crystal display drive method, wherein said liquid crystal display comprises a first substrate having a plurality of scan lines, video data lines and pixel regions disposed therein, a second substrate having a conductor electrode disposed therein and a liquid crystal layer sandwiched between said first substrate and said second substrate, each pixel region comprising a switch transistor, a pixel electrode connected with said switch transistor, a common electrode and a metal electrode expanding from said common electrode, wherein said pixel electrode, said common electrode and said metal electrode are isolated from each other, said drive method comprising:

applying a voltage to said common electrode to transform liquid crystal molecules located between said metal electrode and said conductor electrode and between said common electrode and said conductor electrode from splay state to bend state;

conducting said switch transistor; and applying a voltage to said pixel electrode through said switch transistor to transform liquid crystal molecules in splay state to bend state.

2. The liquid crystal display drive method of claim 1, wherein said scan lines are used to transfer scan signals.

3. The liquid crystal display drive method of claim 2, wherein the gate electrode of said switch transistor is coupled to corresponding scan line, and said corresponding scan line is used to control said switch transistor.

4. The liquid crystal display drive method of claim 2, wherein said scan signals are used to control said switch transistor on/off.

5. The liquid crystal display drive method of claim 2, wherein said pixel electrode is coupled to a corresponding video data line when said switch transistor is turned on by a scan signal.

6. The liquid crystal display drive method of claim 1, wherein said video data lines are used to transfer video data signals.

7. A liquid crystal display drive method, wherein said liquid crystal display comprises a first substrate having a plurality of scan lines, video data lines and pixel regions disposed thereon, a second substrate having a conductor electrode disposed thereon and a liquid crystal layer sandwiched between said first substrate and said second substrate, each pixel region comprising a switch transistor, a pixel electrode connected with said switch transistor, a common electrode and a metal electrode expanding from said common electrode, wherein said pixel electrode, said common electrode and said metal electrode are isolated to each other, said drive method comprising:

conducting said switch transistor;

applying a voltage to said pixel electrode through said switch transistor; and applying a voltage to said common electrode to transform liquid crystal molecules located between said metal electrode and said conductor electrode and between said common electrode and said conductor electrode from splay state to bend state, and to transform the liquid crystal molecules still in splay state to bend state.

8. The liquid crystal display drive method of claim 7, wherein said scan lines are used to transfer scan signals.

9. The liquid crystal display drive method of claim 8, wherein the gate electrode of said switch transistor is coupled to a corresponding scan line, and said corresponding scan line is used to control said switch transistor.

10. The liquid crystal display drive method of claim 8, wherein said scan signals are used to control said switch transistor on/off.

11. The liquid crystal display drive method of claim 8, wherein said pixel electrode is coupled to a corresponding video data line when said switch transistor is turned on by a scan signal.

12. The liquid crystal display drive method of claim 7, wherein said video data lines are used to transfer video data signal.

13. A liquid crystal display drive structure, wherein said liquid crystal display comprises a first substrate having a plurality of scan lines, video data lines and pixel regions disposed therein, a second substrate having a conductor electrode disposed therein and a liquid crystal layer sandwiched between said first substrate and said second substrate, each pixel region comprising a switch transistor, a pixel electrode connected with said switch transistor, a common electrode and a metal electrode expanding from said common electrode, wherein said pixel electrode, said common electrode and said metal electrode are isolated from each other, said drive structure comprising:

means for applying a voltage to said common electrode to transform liquid crystal molecules located between said metal electrode and said conductor electrode and between said common electrode and said conductor electrode from splay state to bend state;

means for conducting said switch transistor; and means for applying a voltage to said pixel electrode through said switch transistor to transform liquid crystal molecules in splay state to bend state.

* * * * *